US008493650B2

(12) United States Patent
Rothenberg et al.

(10) Patent No.: US 8,493,650 B2
(45) Date of Patent: Jul. 23, 2013

(54) METHOD AND APPARATUS FOR SUPPRESSION OF FOUR-WAVE MIXING USING POLARIZATION CONTROL WITH A HIGH POWER POLARIZATION MAINTAINING FIBER AMPLIFIER SYSTEM

(75) Inventors: Joshua E. Rothenberg, Los Angeles, CA (US); Peter A. Thielen, Long Beach, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 0 days.

(21) Appl. No.: 13/351,654

(22) Filed: Jan. 17, 2012

(65) Prior Publication Data
US 2012/0188626 A1    Jul. 26, 2012

Related U.S. Application Data

(60) Provisional application No. 61/461,696, filed on Jan. 21, 2011.

(51) Int. Cl.
*H04B 10/22* (2011.01)

(52) U.S. Cl.
USPC ................... 359/337.13; 398/152; 398/159

(58) Field of Classification Search
USPC ............... 359/239, 249, 334, 337.1, 337.11, 359/337.12, 337.13; 398/152, 158, 159, 160, 398/188; 372/6, 27, 70
See application file for complete search history.

(56) References Cited

U.S. PATENT DOCUMENTS

| | | | |
|---|---|---|---|
| 2005/0201429 A1* | 9/2005 | Rice et al. | 372/27 |
| 2010/0166426 A1* | 7/2010 | Watanabe | 398/81 |

OTHER PUBLICATIONS

T.M. Shay et al; Self-Referenced Locking of Optical Coherence by Single-detector Electronic-Frequency Tagging; Proceedings of SPIE v. 6102, 61020V; 2006; pp. 1-5.
Justin B. Spring et al; Comparison of Stimulated Brillouin Scattering Thresholds and Spectra in Non-Polarization-Maintaining and Polarization-Maintaining Passive Fibers; Proceedings of SPIE v. 5709; pp. 147-156; SPIE, Bellingham, WA 2005.
M.A. Vorontsov et al; Stochastic Parallel-Gradient-Descent Technique for High-Resolution Wave-Front Phase-Distortion Correction; J. Optical Society of America A; vol. 15, No. 10; Oct. 1998; pp. 2745-2758.
Rudiger Paschotta; Field Guide to Optical Fiber Technology Book; 2010; pp. 1-4, 32, 48, 96-116.

* cited by examiner

*Primary Examiner* — Darryl J Collins
*Assistant Examiner* — Gary O'Neill
(74) *Attorney, Agent, or Firm* — Carmen Patti Law Group, LLC

(57) ABSTRACT

A method and apparatus for suppression of four-wave mixing using polarization control with a high power polarization maintaining fiber amplifier system. The apparatus includes a master oscillator (MO) that generates a beam; a polarization controller that receives the beam from the MO and transmits the beam with a desired polarization; a pre-amplifier that receives the beam from the polarization controller, pre-amplifies the beam, and transmits the beam; a high power fiber amplifier that receives the beam from the pre-amplifier, amplifies the beam, and transmits an output beam; and a polarization detector that detects the polarization of the output beam. The polarization detector transmits feedback to the polarization controller to ensure that the output beam components aligned with the principal birefringent axes of the high power fiber amplifier have approximately equal power.

59 Claims, 10 Drawing Sheets

METHOD AND APPARATUS FOR SUPPRESSION OF FOUR-WAVE MIXING USING POLARIZATION CONTROL WITH A HIGH POWER POLARIZATION MAINTAINING FIBER AMPLIFIER SYSTEM

CROSS-REFERENCE TO RELATED APPLICATIONS

This application claims the benefit of U.S. Provisional Patent Application Ser. No. 61/461,696, filed Jan. 21, 2011.

BACKGROUND

The invention relates generally to suppressing four-wave mixing (FWM) including stimulated Brillouin scattering (SBS), more particularly to suppressing FWM including SBS using polarization control with a high power polarization maintaining fiber amplification system.

Stimulated Brillouin Scattering refers to nonlinear effects in high power fibers under which optical power is unintentionally scattered inelastically in the backward direction. Scatter in the backward direction is caused by an interaction of photons and acoustic or vibrational phonons. Acoustics in the fiber are caused by electrostriction due to the electric field produced by the beam of light in the fiber. Acoustic energy in the fiber causes light to be reflected in the backward direction and consequently interferes with the propagation of light forward. This results in a drop of useful output signal. The frequency of the back scattered beam is slightly lower than that of the original beam. Other undesirable behavior can result from other forms of four-wave mixing (FWM) in high power fibers. Examples include, but are not limited to, four-wave mixing, Raman scattering, thermal effects, and modal scattering instabilities.

The frequency shift corresponds to the frequency of emitted phonons due to the Stokes process. This shift, known as the Brillouin shift, is equal to the energy of the phonon excited by the propagating laser signal. At a sufficiently high power in the forward direction of the fiber, some of the signal is back scattered at the Brillouin shifted frequency. SBS is a process whereby nonlinear optical gain produces amplification of the back scattered light. That is, the interference with the light being propagated in the forward direction is not linearly related to the optical power. Instead, SBS effects are not incurred until an SBS threshold of optical power is met. Soon thereafter, the SBS back scattered optical power overwhelms the optical power in the forward direction.

Due to the power limiting effects of SBS and other forms of FWM, it is generally desirable to suppress them as much as possible.

SUMMARY

In one embodiment, there is provided an apparatus for suppression of FWM using polarization control with a high power polarization maintaining fiber amplification system.

Another implementation of the apparatus encompasses a method for suppression of FWM using polarization control with a high power polarization maintaining fiber amplification system.

In one embodiment, there is provided an apparatus for reducing four-wave mixing (FWM), comprising a master oscillator (MO) configured to generate a beam; a polarization controller configured to receive the beam from the MO and to transmit the beam with a desired polarization; a pre-amplifier configured to receive the beam from the polarization controller, to pre-amplify the beam, and to transmit the beam; a high power fiber amplifier configured to receive the beam from the pre-amplifier, to amplify the beam, and to transmit an output beam; and a polarization detector configured to detect the polarization of the output beam, the polarization detector further configured to provide feedback to the polarization controller to ensure that the output beam components aligned with the principal birefringent axes of the high power fiber amplifier have approximately equal power.

In another embodiment, there is provided an apparatus for reducing four-wave mixing (FWM), comprising a master oscillator (MO) configured to generate a beam; a beam splitter configured to receive the beam from the MO and to split it into a plurality of beam components; a plurality of polarization controllers configured to receive the plurality of beam components and to transmit the beam components with desired polarizations; a pre-amplifier configured to receive the beam components from the polarization controllers, to pre-amplify the beam components, and to transmit the beam components; a high power fiber amplifier configured to receive the plurality of beam components from the plurality of pre-amplifiers, to amplify the plurality of beam components, and to transmit a plurality of output beam components; a combiner configured to combine the plurality of output beam components into an output beam; a polarization detector configured to detect the polarization of the output beam; and a polarization processor configured to provide feedback to the plurality of polarization controllers to ensure that the output beam components aligned with the principal birefringent axes of the high power fiber amplifier have approximately equal power.

In another embodiment, an apparatus is provided for reducing four-wave mixing (FWM), comprising a master oscillator (MO) configured to generate a plurality of beams of differing wavelengths and differing angles of incidence; a plurality of polarization controllers configured to receive the plurality of beam components from the MO and to transmit the beam components with desired polarizations; a plurality of pre-amplifiers configured to receive the beam components from the polarization controllers to pre-amplify the beam components, and to transmit the beam components; a plurality of high power fiber amplifiers configured to receive the plurality of beam components from the pre-amplifiers, to amplify the plurality of beam components, and to transmit a plurality of output beam components; a combiner configured to receive the output beam components, to combine the output beam components into an output beam, and to transmit an output beam; a polarization detector configured to detect the polarization of the output beam; and a polarization processor configured to provide feedback to the plurality of polarization controllers to ensure that the output beam components aligned with the principal birefringent axes of the high power fiber amplifier have approximately equal power.

In yet another embodiment, there is provided an apparatus for reducing four-wave mixing (FWM), comprising a master oscillator (MO) configured to generate a beam; a beam splitter configured to receive the beam from the MO and to split it into a plurality of beam components; a plurality of polarization controllers configured to receive the plurality of beam components from the MO and to transmit the beam components with desired polarizations; a plurality of pre-amplifiers configured to receive the beam components from the polarization controllers, to pre-amplify the beam components, and to transmit the beam components; a plurality of high power fiber amplifiers configured to receive the plurality of beam components from the pre-amplifiers, to amplify the plurality of beam components, and to transmit a plurality of output beam components; a tapered fiber bundle (TFB), the TFB configured to receive the plurality of output beam components, to coherently combine the plurality of output beam components into an output beam, and to transmit an output beam; a polarization detector configured to detect the polarization of the output beam components; and a synchronous polarization processor configured to provide feedback to the plurality of polarization controllers to ensure that the output beam components aligned with the principal birefringent axes of the high power fiber amplifier have approximately equal power.

In still another embodiment, there is provided an apparatus for reducing four-wave mixing (FWM), comprising a master oscillator (MO) configured to generate a beam; a beam splitter configured to receive the beam from the MO and to split it into a plurality of beam components; a plurality of polarization controllers configured to receive the plurality of beam components from the MO and to transmit the beam components with desired polarizations; a plurality of pre-amplifiers configured to receive the beam components from the polarization controllers, to pre-amplify the beam components, and to transmit the beam components; a plurality of high power fiber amplifiers configured to receive the plurality of beam components from the pre-amplifiers, to amplify the plurality of beam components, and to transmit a plurality of output beam components; a tiled fiber array (TFA), the TFA configured to receive the plurality of output beam components, to coherently combine the plurality of output beam components into an output beam, and to transmit an output beam; a polarization detector array configured to detect the polarization of the output beam components; and a polarization processor configured to provide feedback to the plurality of polarization controllers to ensure that the output beam components aligned with the principal birefringent axes of the high power fiber amplifier have approximately equal power.

In yet another embodiment, there is provided an apparatus for reducing four-wave mixing (FWM), comprising a master oscillator (MO) configured to generate a beam; a polarization controller configured to receive the beam from the MO and to transmit the beam with a desired polarization; a pre-amplifier configured to receive the beam from the polarization controller, to pre-amplify the beam, and to transmit the beam; a high power fiber amplifier configured to receive the beam from the pre-amplifier, to amplify the beam, and to transmit an output beam; a first phase retardation plate; a second phase retardation plate, the first phase retardation plate and the second phase retardation plate configured to generate a desired polarization state; and a polarization detector configured to detect the polarization of the output beam, the polarization detector further configured to transmit feedback to the polarization controller to ensure that the polarization of the output beam is approximately equal to a desired polarization so as to reduce FWM.

In still another embodiment, there is provided a method for reducing four-wave mixing (FWM), comprising: providing a FWM reduction apparatus comprising: a master oscillator (MO) configured to generate a beam; a polarization controller configured to transmit the beam with a desired polarization; a pre-amplifier configured to receive the beam from the polarization controller, to pre-amplify the beam, and to transmit the beam; a high power fiber amplifier configured to receive the beam from the pre-amplifier, to amplify the beam, and to transmit an output beam; and a polarization detector configured to detect the polarization of the output beam, the polarization detector further configured to provide feedback to the polarization controller; generating a beam using the MO; and controlling the polarization of the output beam using the polarization controller so as to have approximately equal power in the output beam components aligned with the principal birefringent axes of the high power fiber amplifier.

In yet another embodiment, there is provided a method for reducing four-wave mixing (FWM), comprising: providing a FWM reduction apparatus comprising: a master oscillator (MO) configured to generate a beam; a beam splitter configured to receive the beam from the MO and to split it into a plurality of beam components; a plurality of polarization controllers configured to receive the plurality of beam components and to transmit the beam components with desired polarizations; a plurality of pre-amplifiers configured to receive the plurality of beam components from the polarization controllers, to pre-amplify the beam components, and to transmit the beam components; a high power fiber amplifier configured to receive the plurality of beam components from the plurality of pre-amplifiers, to amplify the beam components, and to transmit a plurality of output beam components; a combiner configured to receive the plurality of output beam components, to combine the plurality of output beam components into an output beam, and to transmit the output beam; a polarization detector configured to detect the polarization of the output beam; and a polarization processor configured to provide feedback to the plurality of polarization controllers; generating a beam using the MO; and controlling the polarizations of the plurality of output beam components using the polarization controller so as to have approximately equal power in the output beam components aligned with the principal birefringent axes of the high power fiber amplifier.

DESCRIPTION OF THE DRAWINGS

The accompanying drawings provide visual representations which will be used to more fully describe various representative embodiments and can be used by those skilled in the art to better understand the representative embodiments disclosed herein and their inherent advantages. In these drawings, like reference numerals identify corresponding elements.

DETAILED DESCRIPTION

Figure 1A:
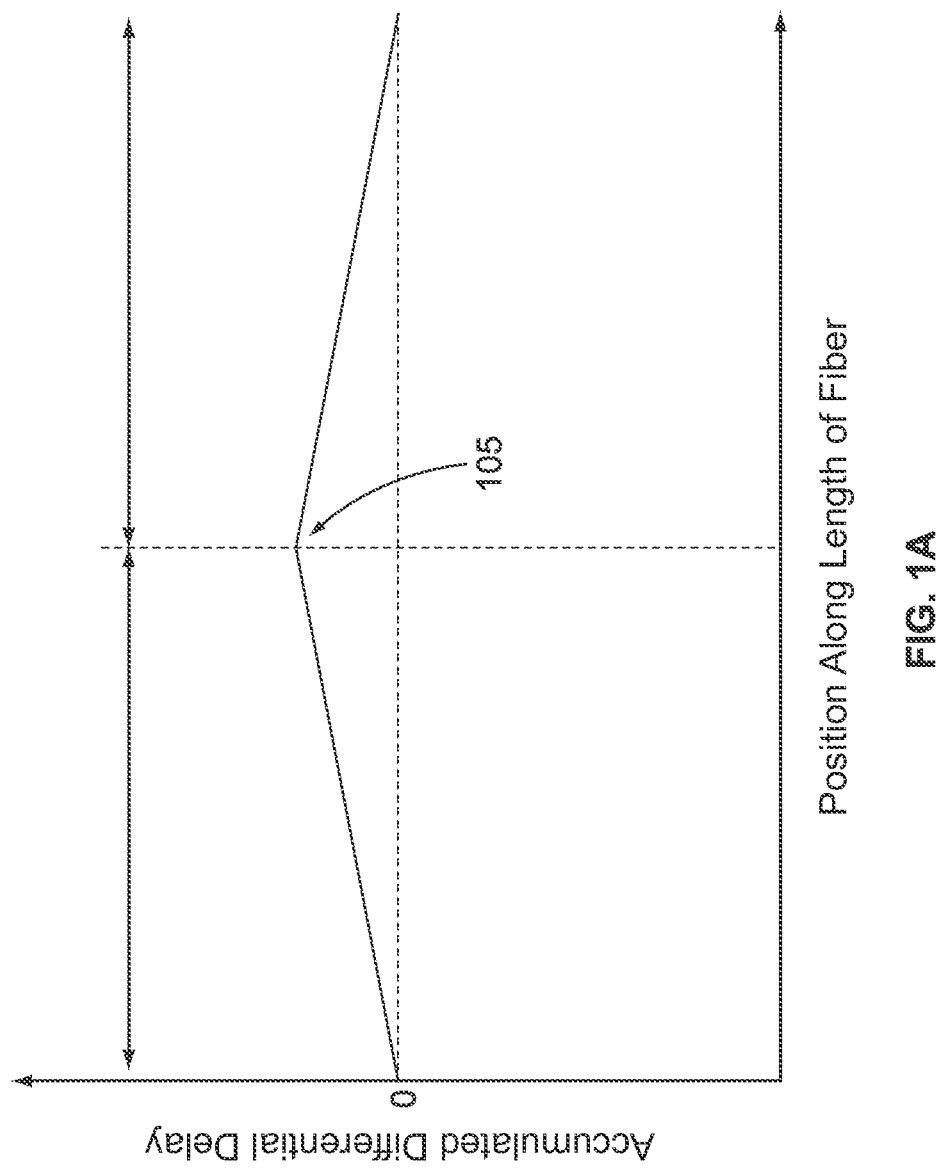
FIG. 1A is a graph illustrating how splicing PM fiber segments of roughly equal birefringence with a 90° angle between the principal birefringent axes may minimize the net differential group delay.

While the present invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the following description and in the several figures of the drawings, like reference numerals are used to describe the same, similar or corresponding parts in the several views of the drawings.

Polarization maintaining (PM) fibers are employed in many applications, including high power fiber amplifiers, with light launched along one of the principal birefringent axes so that thermal and mechanical variations do not alter the output polarization state. However, if both polarization axes of the fiber are excited, then the polarization preserving properties of the PM fiber are defeated. When PM fiber is used and light propagates at a 45 degree angle with respect to the principal birefringent axes of the optical fiber, a very large phase shift develops between the two principal polarizations (typically ~1,000 waves or more in the fiber amp length of ~5 m). As a result of this large shift it was thought impossible to control phase and polarization at the output to a small fraction of a wave.

Experiments performed pursuant to embodiments of the invention unexpectedly demonstrated that excellent polarization control can be achieved using the methods and apparatuses described below in a high power fiber amplifier configuration using a variety of coherent and spectral beam combination architectures. In addition, according to embodiments of the invention, PM fibers with moderate birefringence, which are normally not used because they are ineffective in preserving linear polarization, can be advantageously used according to embodiments of the invention. According to embodiments of the invention, PM fibers may be spliced together with the birefringent axes of the fibers aligned at the splices at approximately a 90° relative angle to substantially cancel the net birefringence.

According to embodiments of the invention, a plurality of high power fiber amplifiers may be seeded by a common master oscillator (MO) of an appropriately chosen bandwidth for FWM control. The beam from the MO may be split, phase modulated as needed for coherent combination and polarization controlled (by known prior art technique) before seeding a number of fiber amplifiers. The high power fiber amplifiers may comprise one or more stages to increase the output power to a desired level. In the high power fiber amplifier, one or more sections of PM fiber may be used.

According to embodiments of the invention, a polarization detector may be positioned at the output from the high power fiber amplifier. Using feedback from the polarization detector, a polarization processor may be employed to ensure that the output beam components aligned with the principal birefringent axes of the high power fiber amplifier to have approximately equal power.

According to embodiments of the invention, using feedback from the polarization detector, a polarization processor may be employed to ensure that the polarization of the output beam is approximately linear.

According to embodiments of the invention, using feedback from the polarization detector, a polarization processor may be employed to ensure that the polarization angle is approximately 45 degrees with respect to the principal birefringent axes of the high power fiber amplifier.

According to embodiments of the invention, using feedback from the polarization detector, a polarization processor may be employed to ensure that the polarization of the output beam is approximately circular.

According to embodiments of the invention, using feedback from the polarization detector, a polarization processor may be employed to ensure that the polarization of the output beam is approximately elliptical.

According to embodiments of the invention, using feedback from the polarization detector, a polarization processor may be employed to ensure that the major axis of the ellipse has an angle of approximately 45 degrees with respect to the principal birefringent axes of the high power fiber amplifier.

According to embodiments of the invention, using feedback from the polarization detector, a polarization processor may be employed to ensure that the polarization of the output beam is approximately linear According to embodiments of the invention, using feedback from the polarization detector, a polarization processor may be employed to ensure that the polarization of the output beam has a polarization angle of approximately 45 degrees with respect to the principal birefringent axes of the PM fiber.

According to embodiments of the invention, the FWM threshold of the high power fiber amplifier may be thereby increased by a factor of up to approximately two compared to the FWM threshold applicable where the polarization of the output beam has a usual orientation whereby it is substantially aligned with one of the principal birefringent axes of the PM fiber.

According to embodiments of the invention, approximately equal power in the two polarization modes promotes suppression of FWM. When light is launched along a birefringent fiber's two principal axes, the fast axis and the slow, the resulting differential delay between the two polarization modes accumulates as the light travels down the fiber. This differential delay is caused by the different indices of refraction that correspond to the fast and slow modes. If the accumulated differential delay exceeds a small fraction of the coherence length of the light, the two polarization modes will not coherently combine at the output of the fiber.

FIG. 1A is a graph illustrating how splicing PM fiber segments of roughly equal birefringence with a 90° angle between the principal birefringent axes according to embodiments of the invention may minimize the net differential group delay. According to embodiments of the invention, as shown in FIG. 1A, it may be advantageous to splice together PM fiber segments with a 90° angle between the principal birefringent axes so the fast and slow axes are interchanged, such that the net differential group delay between the fiber axes is minimized.

The splice results, according to embodiments of the invention, in an interchange of fast and slow axes at the point of the splice that reverses the accumulated delay as indicated in FIG.

1A. As a result, light that travels down the slow axis of the first fiber segment then travels down the fast axis of the second fiber segment, and vice versa, resulting as illustrated in FIG. 1A in a differential delay of approximately zero.

FIG. 1A plots the accumulated differential delay of the two polarization modes as a function of position along the length of fiber in the high power fiber amplifier. An inflection point that is indicated by the arrow in FIG. 1A coincides with the point of the splice 105. The delay that builds during propagation in one fiber is effectively cancelled through propagation in the other, and therefore the net delay through the power amplifier is minimized. This allows equal power to be maintained between the polarization modes in the two fiber segments that are spliced together.

These one or more fibers can be active or passive, and the only requirement is that the net delay from the sum of the products of length and birefringence along the principal birefringent axes of the spliced fiber composition is below the requirement imposed by the system bandwidth for a given application.

Figure 1B:
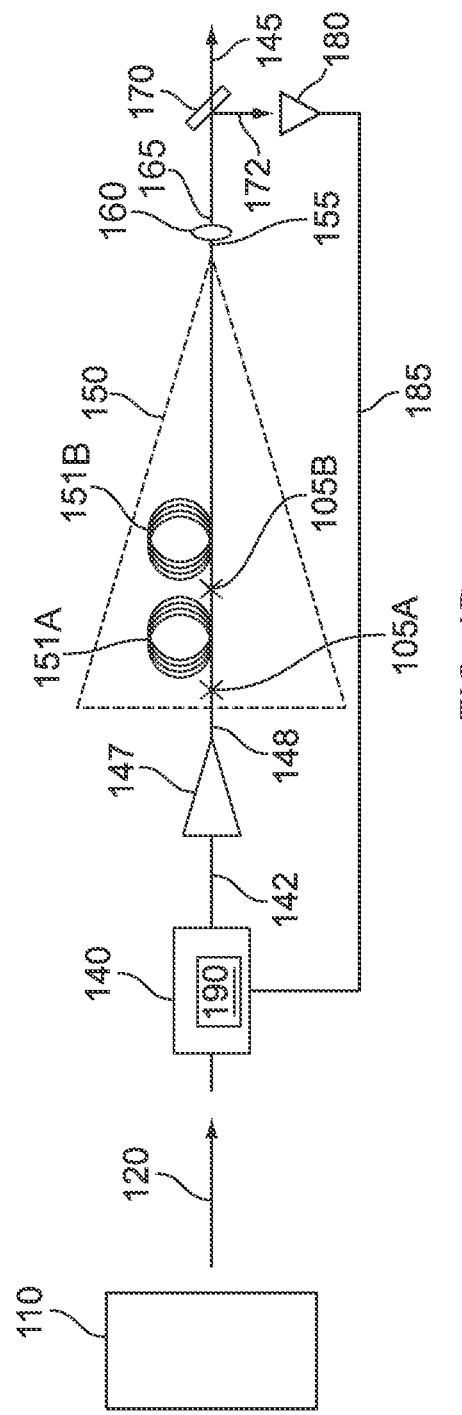
FIG. 1B is a schematic drawing of an apparatus for suppression of FWM using polarization control with a high power PM fiber amplification system.

FIG. 1B is a schematic drawing of an apparatus for suppression of FWM using polarization control with a high power PM fiber amplification system.

In FIG. 1B, the master oscillator (MO) 110 generates a signal 120 or beam 120, preferably an input beam 120 of low power seed light. The input beam 120 first passes through a polarization controller 140. The polarization controller 140 has the ability to transform any arbitrary state of polarization of input beam 120 into a desired state of polarization of a polarization-controlled beam 142. The polarization-controlled beam 142 eventually emerges as an output beam 145 after passing through a pre-amplifier 147, through high power fiber amplifier 150, and through other components discussed below. The polarization controller 140 adjusts the polarization of the polarization-controlled beam 142 to ensure that the polarization of the output beam 145 is approximately equal to a desired polarization. The FWM threshold of the fiber amplifier 150 may be thereby increased by a factor of up to approximately two.

Preferably, the pre-amplifier 147 comprises non-PM fiber. The pre-amplifier 147 may comprise one or more stages (not shown), in part to increase the output power to a desired level. The pre-amplifier stages may be separated by one or more optical isolators (not shown) to prevent feedback and backward oscillation. The pre-amplifier 147 increases the signal power of the resulting pre-amplified beam 148. For efficient operation, the increase in the signal power of pre-amplified beam 148 produced by the pre-amplifier 147 is preferably sufficient to fully saturate the high power fiber amplifier 150. Between stages of the pre-amplifier and power amplifier, it may be desirable to provide optical isolators to avoid feedback instabilities.

After passing through the polarization controller 140 and the pre-amplifier 147, the pre-amplified beam 148 passes through a high power fiber amplifier 150. The pre-amplifier 147 and the high power fiber amplifier 150 may be separated by one or more optical isolators (not shown) to prevent feedback and backward oscillation. The high power fiber amplifier 150 may comprise one or more stages (not shown), in part to increase the output power to a desired level. The amplifier stages may be separated by one or more optical isolators to prevent feedback and backward oscillation.

Preferably, an optical fiber functions as the high power fiber amplifier 150. Preferably, the high power fiber amplifier 150 comprises one or more fiber segments 151A and 151B.

The high power fiber amplifier 150 preferably comprises at least one section 151A or 151B of fiber that is active fiber, for example, a section doped with ytterbium. Alternatively, at least one section 151A or 151B of fiber may be doped with a gain-producing substance other than ytterbium. The high power fiber amplifier 150 preferably has moderate birefringence, for example, birefringence less than or equal to approximately $1 \times 10^{-5}$-$1 \times 10^{-4}$. The birefringence will preferably be chosen to provide a beat length in the optical fiber (wavelength divided by birefringence) that is less than the gain length of the SBS or other forms of FWM. It is preferable to keep the birefringence as small as possible within this gain length constraint, since large birefringence can lead to excessive loss in one of the polarization states of the fiber amplifier, particularly in coiled large mode area fiber amplifiers with low numerical aperture (NA), which are of great interest for high power applications.

The high power fiber amplifier 150 preferably comprises at least two PM fiber segments 151A and 151B that are spliced together at respective splices 105A and 105B. At the splices 105A and 105B, the birefringent axes of the two segments 151A and 151B of PM fiber are preferably aligned at either approximately a 0° relative angle or approximately a 90° relative angle.

The high power fiber amplifier 150 increases the signal power of the resulting amplified beam 155. The combined action of pre-amplifier 147 and high power fiber amplifier 150 amplifies pre-amplified beam 148 to a desired power level and transmits the resulting amplified beam 155.

After the high power fiber amplifier 150, the amplified beam 155 passed through a collimating lens 160, which collimates the amplified beam 155, generating a collimated beam 165. Next the collimated beam 165 passes through a polarizing beam splitter 170, which transmits a high power output beam 145 and reflects a low power sample beam 172 that is directed to polarization detector 180.

The polarization controller 140 has the ability to transform any arbitrary state of polarization of input beam 120 into any arbitrary state of polarization of output beam 145. The polarization controller 140 is configured to ensure a high degree of linear polarization in output beam 145. A polarization detector 180 detects the polarization state of the low power sample beam 172 and thereby determines the polarization of the output beam 145. The polarization detector then transmits output in the form of polarization feedback 185 to a polarization processor 190 (in this case comprised within the polarization controller 140) which transmits polarization instructions to the polarization controller 140 based on the polarization feedback 185. Although here the polarization processor 190 is comprised within the polarization controller 140, the polarization processor 190 may also be separate from the polarization controller 140, as shown in FIGS. 2-5. Preferably, the polarization feedback 185 may be in the form of a polarization error signal 185. Polarization feedback control loops within the polarization processor 190 adjust the polarization of output beam 145 to minimize (or maximize) the polarization error signal 185.

The polarization feedback 185 and the feedback control loop within the polarization processor 190 ensure that the polarization controller 140 aligns the polarization axis of the output beam 145 to a desired axis. Further, the portions of the output beam components aligned with the principal birefringent axes of the high power fiber amplifier 150 have approximately equal power.

Alternatively, in place of polarizing beam splitter 170, a non-polarizing beam splitter maybe employed in conjunction with an optical device configured to receive the beam emitted from the non-polarizing beam splitter and to generate a polarization error signal using a polarizer or another means for generating a polarization error signal.

According to embodiments of the invention, the feedback loop of the polarization controller 140 minimizes the polarization error signal 185 by launching the appropriate polarization into the high power fiber amplifier 150 such that after experiencing the accumulated birefringence throughout the high power fiber amplifier 150, the state of polarization of the output beam 145 will be substantially linear and will be approximately aligned with a desired polarization axis of known orientation relative to the principal birefringent axes of the high power fiber amplifier 150. This ensures that the polarization components of the output beam 145 aligned with the principal birefringent axes of the high power fiber amplifier 150 have approximately equal power, yielding an improvement by a factor of approximately two in the FWM threshold.

This invention enables approximately two times higher laser power scaling by combination of high power fiber lasers. These lasers are now limited in power by FWM, which can be diminished by the technique described, thereby enabling more power from the system than would otherwise be possible. This class of techniques requires the output beams from many independent fibers to be identically polarized, which is accomplished simultaneously here by a polarization control method.

Surprisingly, despite the large accumulated birefringence, this polarization control approach works with PM fibers, and the polarization of the output beam 145 after exiting the high power fiber amplifier can be maintained as substantially linear at an arbitrary angle to the principal birefringent axes of the PM fiber.

Figure 2:
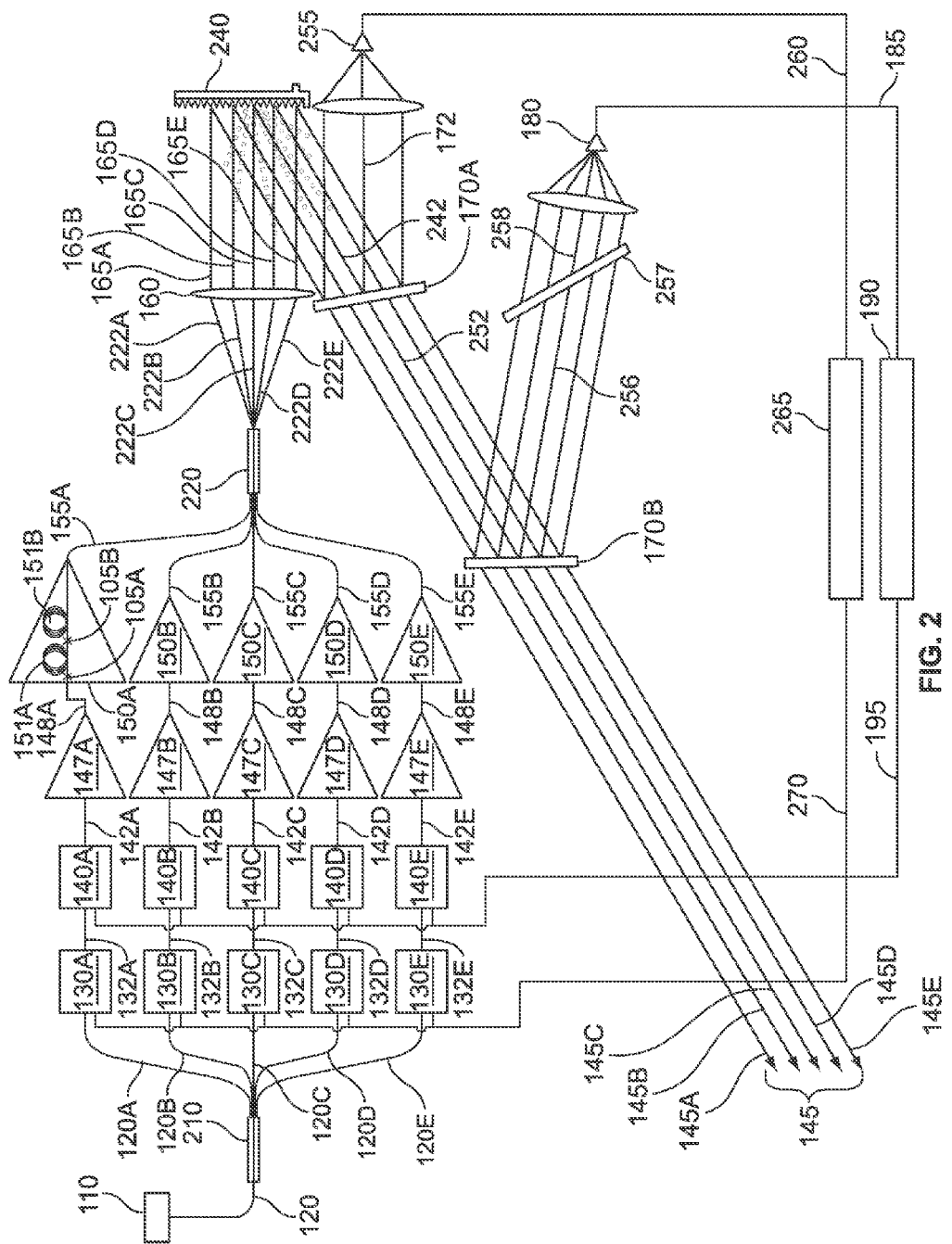
FIG. 2 is a drawing of an apparatus for suppression of FWM using polarization control and phase control with a high power PM fiber amplification system in a coherent beam combination architecture.

FIG. 2 is a drawing of an apparatus for suppression of FWM with a high power PM fiber amplification system using polarization control and phase control pursuant to a coherent signal combination architecture and employing a diffractive optical element (DOE) as a combiner.

An MO 110 of appropriate spectral characteristics (usually phase modulated for suppression of FWM) is split into a number of beams, each of which can have its piston phase adjusted by a piston phase modulator, and its polarization adjusted by a polarization controller that receives feedback signals from a polarization detector and processor. These seed beams are then amplified to respective desired power levels and combined either coherently (shown) or spectrally (not shown, but with a similar architecture). The combined output beam is sampled to sense both the phase and polarization.

In FIG. 2, the MO 110 of appropriate spectral characteristics generates an input beam 120, preferably an input beam 120 of low power seed light. The MO 110 is preferably phase modulated in order to suppress FWM. The input beam 120 passes through a beam splitter 210 that divides the input beam 120 into N component input beams 120A-120E. In this example, N=5.

One or more of the component input beams 120A-120E then passes through one or more respective piston phase modulators 130A-130E. The one or more piston phase modulators 130A-130E have the ability to transform the piston phases of respective component input beams 120A-120E into any arbitrary phases in the resulting component modulated beams 132A-132E. One or more of component modulated beams 132A-132E has its piston phase adjusted by one of the respective piston phase modulators 130A-130E as needed to control coherent combination in the output beam 145.

Next component modulated beams 132A-132E pass through respective polarization controllers 140A-140E. As above, the one or more polarization controllers 140A-140E have the ability to transform the polarizations of respective component modulated beams 132A-132E into any arbitrary state of polarization for the resulting component polarization-controlled beams 142A-142E. The component polarization-controlled beams 142A-142E eventually emerge as output beam 145, comprising component output beams 145A-145E, after passing through respective pre-amplifiers 147A-147E, through respective high-power fiber amplifiers 150A-150E, and through other components discussed below.

The polarization controllers 140A-140E adjust the polarizations of the respective component polarization-controlled beams 142A-142E to ensure that the polarization of the output beam 145 is approximately equal to a desired polarization. To help ensure that the output beam components 145A-145E have similar polarizations, it is preferable that the respective principal birefringent axes of the corresponding high power fiber amplifiers 150A-150E be substantially aligned with each other.

The FWM thresholds of the respective high power fiber amplifiers 150A-150E may again be thereby increased by a factor of up to approximately two.

Preferably, the respective pre-amplifiers 147A-147E comprise non-PM fiber. As before, the respective pre-amplifiers 147A-147E increase the signal power of the component polarization-controlled beams 142A-142E, transmitting component pre-amplified beams 148A-148E. The respective pre-amplifiers 147A-147E may comprise one or more stages (not shown), in part to increase the output power to a desired level. The pre-amplifier stages may be separated by one or more optical isolators (not shown) to prevent feedback and backward oscillation.

Next the respective component pre-amplified beams 148A-148E pass through respective high power fiber amplifiers 150A-150E. The pre-amplifiers 147A-147E and the high power fiber amplifiers 150A-150E may be separated by one or more optical isolators (not shown) to prevent feedback and backward oscillation. The high power fiber amplifiers 150A-150E may comprise one or more stages (not shown) in part to increase the output power to a desired level. The amplifier stages may be separated by one or more optical isolators (not shown) to prevent feedback and backward oscillation.

Again the increase in the signal power of respective component pre-amplified beams 148A-148E produced by respective pre-amplifiers 147A-147E is sufficient to fully saturate the respective high power fiber amplifiers 150A-150E, thereby efficiently generating component amplified beams 155A-155E.

Again, high power fiber amplifiers 150A-150E preferably comprise one or more fiber segments 151A and 151B. As before, the high power fiber amplifiers 150A-150E preferably comprise at least one respective section 151A-151E that is active fiber, for example, a section doped with ytterbium. Alternatively, at least one section 151A or 151B of fiber may be doped with a gain-producing substance other than ytterbium. Again, the high power fiber amplifiers 150A-150E preferably have moderate birefringence, for example, birefringence less than or equal to approximately $1\times10^{-5}$-$1\times10^{-4}$. As before, the birefringence will preferably be chosen to provide a beat length in the optical fiber that is less than the gain length of the SBS or other forms of FWM. Again, as explained above, it is preferable to keep the birefringence as small as possible within this gain length constraint because large birefringence can lead to excessive loss in one of the polarization states of the fiber amplifier.

As before, the high power fiber amplifier 150 may comprise at least two PM fiber segments 151A and 151B that are spliced together at respective splices 105A and 105B. To simplify illustration, only high power fiber amplifier 150A is shown as comprising fiber segments 151A and 151B and splices 105A and 105B. Commonly, the high power fiber amplifiers 150A-150E will comprise multiple fiber segments 151A and 151B and multiple corresponding splices 105A and 105B. At the respective splices 105A and 105B, the birefringent axes of the two respective segments 151A and 151B of PM fiber are preferably aligned at either approximately a 0° relative angle or approximately a 90° relative angle. This approach of swapping fast and slow axes of the PM fiber by employing approximate relative angles of 90° between axes at the splices between segments may be used to reduce the net birefringence if desirable. The combined action of respective pre-amplifiers 147A-147E and respective high power fiber amplifiers 150A-150E amplifies respective component pre-amplified beams 148A-148E to respective desired power levels and transmits resulting component amplified beams 155A-155E.

After the respective high power fiber amplifiers 150A-150E, the respective component amplified beams 155A-155E are sent into an appropriately spaced fiber array 220, thereby generating respective component assembled beams 222A-222E.

The respective component assembled beams 222A-222E then pass through a collimating optic 160, which collimates respective component assembled beams 222A-222E, generating respective component collimated beams 165A-165E. Next respective component collimated beams 165A-165E are directed onto a combiner 240 at the appropriate respective angles of incidence where they are coherently combined into a single combined beam 242. The single combined beam 242 comprises components that can be individually modulated according to embodiments of the invention. The combiner 240 is preferably a DOE 240.

The apparatus comprises two beam samplers, a first beam sampler 170A and a second beam sampler 170B. The first beam sampler 170A samples the combined beam 242 and transmits a sampled beam 252 while reflecting a first low power sample beam 172 to a phase detector 255. Sampled beam 252 passes through the second beam sampler 170B. The second beam sampler 170B samples the sampled beam 252 and reflects a second low sample power beam 256 through a polarizing filter 257 while transmitting output beam 145. After passing through polarizing filter 257, the resulting polarized beam 258 passes on to polarization detector 180.

Phase detector 255 detects the phase of the first low power sample beam 172 and thereby determines the phases of the output beam components 145A-145E and transmits output in the form of phase feedback 260 to a phase processor 265 which transmits phase instructions 270 to the piston phase modulators 130A-130E based on the phase of the first low power sample beam 172. Preferably, the phase feedback 260 may be in the form of a phase error signal 260. Phase feedback control loops within the phase controller 265 adjust the phase of output beam 145 to minimize (or maximize) the phase error signal 260.

As above, polarization detector 180 detects the polarization state of the second low power sample beam 256, thereby determines the polarization of the output beam components 145A-145E, and transmits output in the form of polarization feedback 185 to a polarization processor 190 which transmits polarization instructions 195 to the polarization controllers 140A-140E based on the polarization feedback 185. Preferably, the polarization feedback 185 may be in the form of polarization error signals 185. Polarization feedback control loops within the polarization processor 190 adjusts the polarization of output beam components 145A-145E to minimize (or maximize) the polarization error signals 185.

The polarization feedback 185 and the polarization feedback control loop within the polarization processor 190 ensure that the polarization controllers 140A-140E align the polarization axis of the output beam components 145A-145E with a desired polarization axis of known orientation relative to the principal birefringent axes of the high power fiber amplifier 150. This ensures that the components of the output beam 145 aligned with the principal birefringent axes of the high power fiber amplifier 150 have approximately equal power, yielding an improvement by a factor of approximately two in the FWM threshold.

Further, the portions of the output beam components 145A-145E aligned with the principal birefringent axes of the corresponding high power fiber amplifiers 150A-150E have approximately equal power.

Set up as described, the phase processor 265, by using phase feedback 260, minimizes the phase error signal 260 by sending appropriate phase instructions 270 to the piston phase modulators 130A-130E. Similarly, the polarization processor 190, using the polarization feedback 185, sends appropriate polarization instructions 195 to polarization controllers 140A-140E. Accordingly, after experiencing the accumulated birefringence throughout the corresponding high power fiber amplifiers 150A-150E, the portions of the output beam components 145A-145E aligned with the principal birefringent axes of the high power fiber amplifier will have approximately equal power, yielding an improvement by a factor of approximately two in the FWM thresholds.

The plurality of high power fiber amplifier outputs with controlled polarizations and controlled phases can then be combined using one of many coherent or spectral combining techniques.

Figure 3A:
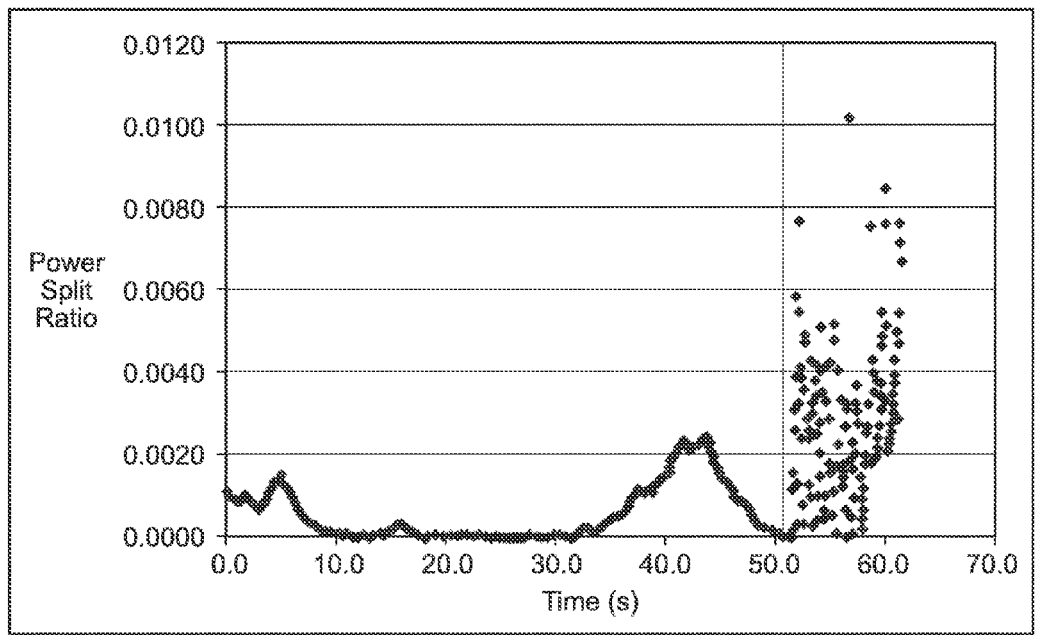
FIG. 3A is a graph of power split ratio as a function of time that illustrates that a polarization purity of approximately 99% was achieved in an experiment carried out according to embodiments of the invention.

FIG. 3A is a graph of polarimeter data that illustrates that a linear output polarization was achieved with a polarization purity of approximately 99%. The power split ratio between the two polarization axes is plotted as a function of time. The vertical line at approximately 51 seconds corresponds to the inflection point created at the point in time at which the fiber was mechanically perturbed or wiggled.

Figure 3B:
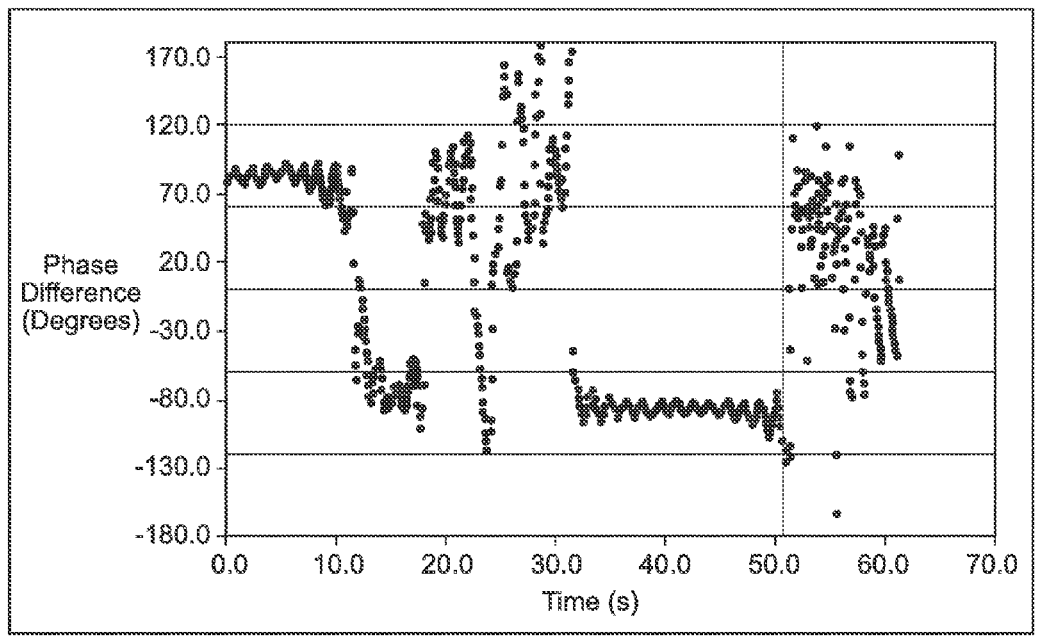
FIG. 3B is a graph of phase difference as a function of time that illustrates that a polarization purity of approximately 99% was achieved in an experiment carried out according to embodiments of the invention.

FIG. 3B is a graph of polarimeter data that illustrates the phase difference as a function of time as achieved in this same experiment. As mentioned in connection with FIG. 3A, a polarization purity of approximately 99% was achieved. The vertical line at approximately 51 seconds again corresponds to the inflection point created at the point in time at which the fiber was mechanically perturbed or wiggled. Accordingly, by employing PM fibers in a high power fiber amplifier according to embodiments of the invention, FWM may be suppressed by adjusting the polarization controller to maintain the output beam components aligned with the principal birefringent axes of the high power fiber amplifier 150 at approximately equal power.

This method can be used for power scaling in a spectral or coherent beam combination system. In either approach, a polarized output from a plurality of high power fiber amplifiers is desirable.

Figure 4A:
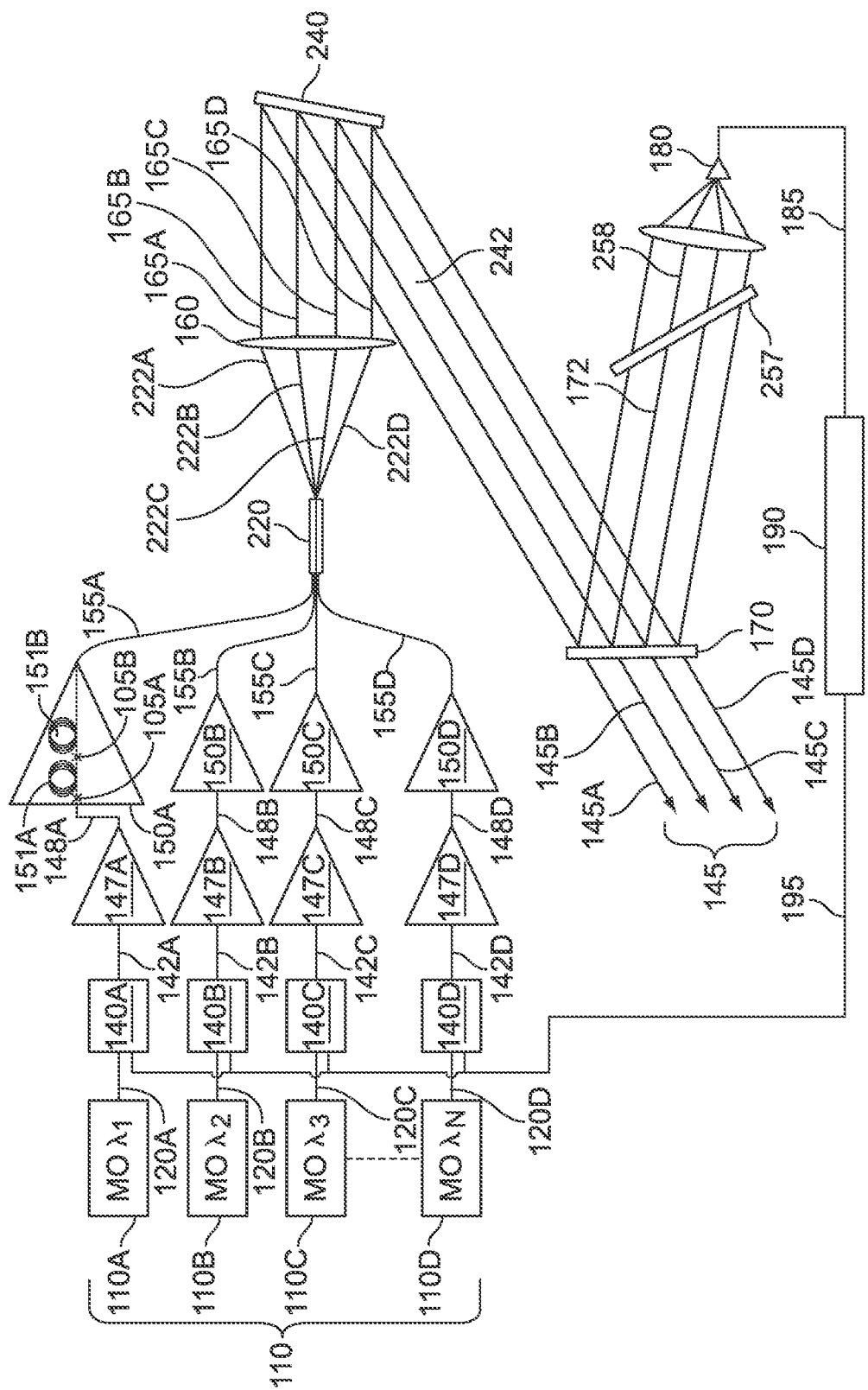
FIG. 4A is a drawing of an apparatus for suppression of FWM using polarization control with a high power PM fiber amplification system in a spectral beam combination architecture.

FIG. 4A is a drawing of an apparatus for suppression of FWM with a high power PM fiber amplification system using polarization control pursuant to a spectral beam combination architecture and employing a grating as a combiner.

According to the example shown in FIG. 4A, similar advantages in suppressing FWM can be achieved in a spectral system as in a coherent system. The spectral architecture does not require phase control, and thus only a single sampled beam and polarization detector are needed to provide polarization feedback and thereby facilitate control of the polarization at the desired orientation with respect to the principal birefringent axes of the PM fiber segment. Although FIG. 4A depicts a polarizing filter 257, because the gratings used in this architecture are generally fairly polarizing, it may be that the filter may not in fact be needed in some configurations.

In FIG. 4A, an MO 110 of appropriate spectral characteristics comprises a plurality of N MO's 110A-110D, each configured to generate a component input beam 120A-120D with a different respective wavelength $\lambda_A$, $\lambda_B$, $\lambda_C$, $\lambda_D$, preferably a component input beam 120A-120D of low power seed light. In this example, N=4.

Next one or more component input beams 120A-120D pass through respective polarization controllers 140A-140D, which, as above, have the ability to transform the polarizations of respective component input beams 120A-120D into any arbitrary state of polarization for the resulting component polarization-controlled beams 142A-142D. The component polarization-controlled beams 142A-142D eventually emerge as output beam 145, comprising component output beams 145A-145E, after passing through one or more respective high power pre-amplifiers 147A-147D, then through one or more respective high power fiber amplifiers 150A-150D, and through other components discussed below.

The polarization controllers 140A-140D again adjust the polarizations of the respective component polarization-controlled beams 142A-142D to ensure that the polarization of the output beam 145 is approximately equal to a desired polarization. To help ensure that the output beam components 145A-145D have similar polarizations, it is preferable that the respective principal birefringent axes of the corresponding high power fiber amplifiers 150A-150E be substantially aligned with each other. The FWM thresholds of the high power fiber amplifiers 150A-150E may again be thereby increased by a factor of up to approximately two.

Preferably, the respective pre-amplifiers 147A-147D comprise non-PM fiber. As above, the respective pre-amplifiers 147A-147D increase the signal power of the resulting respective component pre-amplified beams 148A-148D. As above, the respective pre-amplifiers 147A-147D may comprise one or more pre-amplifier stages (not shown), in part to increase the output power to a desired level. Again, the pre-amplifier stages may be separated by one or more optical isolators (not shown) to prevent feedback and backward oscillation.

Next respective component pre-amplified beams 148A-148D then pass through respective high power fiber amplifiers 150A-150D. As above, the increase in the signal power of respective component pre-amplified beams 148A-148D produced by respective pre-amplifiers 147A-147D is sufficient to fully saturate the respective high power fiber amplifiers 150A-150D, thereby efficiently generating component amplified beams 155A-155D. Again, the pre-amplifiers 147A-147D and the high power fiber amplifiers 150A-150D may be separated by one or more optical isolators (not shown) to prevent feedback and backward oscillation. Again, the high power fiber amplifiers 150A-150D may comprise one or more high power fiber amplifier stages (not shown), in part to increase the output power to a desired level. The amplifier stages may be separated by one or more optical isolators (not shown) to prevent feedback and backward oscillation.

As before, the high power fiber amplifiers 150A-150D preferably comprise one or more fiber segments 151A and 151B. As above, the high power fiber amplifiers 150A-150D preferably comprise at least one respective section 151A or 151B that is active fiber, for example, a section doped with ytterbium. As above, the high power fiber amplifiers 150A-150D preferably have moderate birefringence, for example, birefringence less than or equal to approximately $1 \times 10^{-5}$-$1 \times 10^{-4}$. Again the birefringence will preferably be chosen to provide a beat length in the optical fiber that is less than the gain length of the SBS or other forms of FWM, with birefringence preferably as small as possible given this constraint on gain length.

As before, the high power fiber amplifiers 150A-150D preferably comprise at least two respective segments 151A and 151B of PM fiber that are spliced together at respective splices 105A and 105B and are preferably aligned at the respective splices 105A and 105B at either approximately a 0° relative angle or approximately a 90° relative angle. Again, to simplify illustration, only high power fiber amplifier 150A is shown as comprising fiber segments 151A and 151B and splices 105A and 105B. Commonly, the high power fiber amplifiers 150A-150E will comprise multiple fiber segments 151A and 151B and multiple corresponding splices 105A and 105B.

The combined action of respective pre-amplifiers 147A-147D and respective high power fiber amplifiers 150A-150D again amplifies respective component pre-amplified beams 148A-148D to respective desired power levels and transmits resulting component amplified beams 155A-155D.

After the respective high power fiber amplifiers 150A-150D, the respective component amplified beams 155A-155D are sent into an appropriately spaced fiber array 220, thereby generating respective component assembled beams 222A-222D.

Respective component assembled beams 222A-222D then pass through a collimating optic 160 that collimates respective assembled beams 222A-222D, thereby generating respective component collimated beams 165A-165D. Next, component collimated beams 165A-165D are directed onto combiner 240 at the appropriate respective angles of incidence where they are spectrally combined into a single combined beam 242. The single combined beam 242 comprises components that can be individually modulated according to embodiments of the invention. The combiner 240 is preferably a grating 240.

A beam sampler 170 samples the combined beam 242 and reflects a low power sample beam 172 while transmitting output beam 145. Low power sample beam 172 passes through polarizing filter 257, after which the resulting polarized beam 258 passes on to polarization detector 180.

Polarization detector 180 detects the polarization state of the low power sample beam 172 and transmits output in the form of polarization feedback 185 to a polarization processor 190 which transmits polarization instructions 195 to the polarization controllers 140A-140D based on the polarization feedback 185. Preferably, the polarization feedback 185 may be in the form of polarization error signals 185. Polarization feedback control loops within the polarization processor 190 adjust the polarization of output beam 145 to minimize (or maximize) the polarization error signal 185.

The polarization feedback 185 and the polarization feedback control loops within the polarization processor 190 ensure that the polarization controllers 140A-140D align the polarization axes of the output beam components 145A-145D with a desired polarization axis of known orientation relative to the principal birefringent axes of the high power fiber amplifier 150. This ensures that the components of the output beam 145 aligned with the principal birefringent axes of the high power fiber amplifier 150 have approximately equal power, yielding an improvement by a factor of approximately two in the FWM threshold.

For example, the desired polarization axis will preferably be the dispersion axis of the grating 240, which is generally the most efficient. Further, the output beam components 145A-145D aligned with the principal birefringent axes of the corresponding high power fiber amplifiers 150A-150D have approximately equal power. Thus it is preferable that the principal birefringent axes of the high power fiber amplifiers 150A-150D are oriented at approximately a 45° angle relative to the dispersion axis or grooves of the grating 240.

Set up as described, the polarization processor 190, using the polarization feedback 185, sends appropriate polarization instructions 195 to polarization controllers 140A-140D. Accordingly, after experiencing the accumulated birefringence throughout the high power fiber amplifiers 150A-150D, the state of polarization of the collimated output beams 165A-165D will be substantially linear and will be approximately aligned with the preferred polarization axis of the grating. This ensures that the power of the portions of the output beam components 145A-145D aligned with the principal birefringent axes of the respective high power fiber amplifiers 150A-150D will have approximately equal power, yielding an improvement by a factor of approximately two in the FWM thresholds.

Other coherent combination approaches are also applicable pursuant to alternative embodiments of the invention.

Figure 4B:
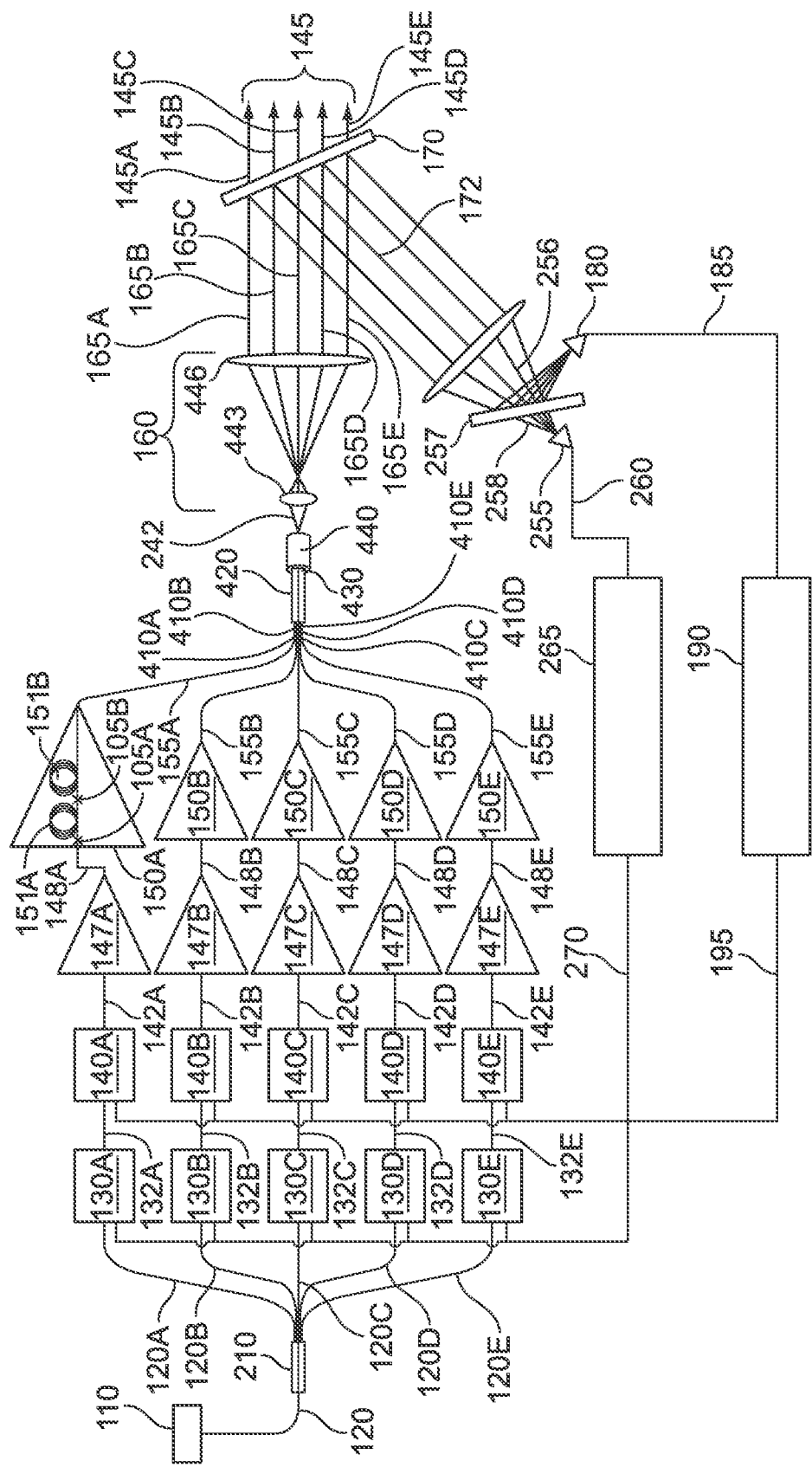
FIG. 4B is a drawing of an apparatus for suppression of FWM using polarization control and phase control with a combiner comprising a tapered fiber bundle in a coherent beam combination architecture.

FIG. 4B is a drawing of an apparatus for suppression of FWM using polarization control and phase control with a tapered fiber bundle (TFB) pursuant to a coherent signal combination architecture.

In FIG. 4B, an MO 110 of appropriate spectral characteristics generates an input beam 120, preferably an input beam 120 of low power seed light. The MO 110 is preferably phase modulated in order to suppress FWM. The input beam 120 passes through a beam splitter 210 that divides the input beam 120 into N component input beams 120A-120E. In this example, N=5.

One or more of the component input beams 120A-120E then passes through one or more respective piston phase modulators 130A-130E. The one or more piston phase modulators 130A-130E again have the ability to transform the piston phases of respective component input beams 120A-120E into any arbitrary phases in the resulting component modulated beams 132A-132E. One or more of component modulated beams 132A-132E has its piston phase adjusted by one of the respective piston phase modulators 130A-130E as needed to control coherent combination in the output beam 145.

Next one or more component modulated beams 132A-132E pass through respective polarization controllers 140A-140E, which, as above, have the ability to transform the polarizations of respective component input beams 120A-120E into any arbitrary state of polarization for the resulting component polarization-controlled beams 142A-142E. The component polarization-controlled beams 142A-142E eventually emerge as output beam 145, comprising component output beams 145A-145E, after passing through one or more respective pre-amplifiers 147A-147E, then through one or more respective high power fiber amplifiers 150A-150E, and through other components discussed below.

The polarization controllers 140A-140E again adjust the polarizations of the respective component polarization-controlled beams 142A-142E to ensure that the polarizations of the output beam components 145A-145E are approximately equal to a desired polarization. To help ensure that the output beam components 145A-145E have similar polarizations, it is preferable that the respective principal birefringent axes of the corresponding high power fiber amplifiers 150A-150E be substantially aligned with each other. The FWM thresholds of the high power fiber amplifiers 150A-150E may again be thereby increased by a factor of up to approximately two.

Preferably, the respective pre-amplifiers 147A-147E comprise non-PM fiber. As above, the respective pre-amplifiers 147A-147E increase the signal power of the resulting respective component pre-amplified beams 148A-148E. Again, the respective pre-amplifiers 147A-147E may comprise one or more pre-amplifier stages (not shown), and again, the pre-amplifier stages may be separated by one or more optical isolators (not shown).

Next respective component pre-amplified beams 148A-148E then pass through respective high power fiber amplifiers 150A-150E. As above, the increase in the signal power of respective component pre-amplified beams 148A-148E produced by respective pre-amplifiers 147A-147E is sufficient to fully saturate the respective high power fiber amplifiers 150A-150E, thereby efficiently generating component amplified beams 155A-155E. Again, the pre-amplifiers 147A-147E and the high power fiber amplifiers 150A-150E may be separated by one or more optical isolators (not shown). Again, high power fiber amplifiers 150A-150E may comprise one or more high power fiber amplifier stages (not shown), in part to increase the output power to a desired level.

As before, the high power fiber amplifiers 150A-150E preferably comprise one or more fiber segments 151A and 151B. As above, the high power fiber amplifiers 150A-150E preferably comprise at least one respective section 151A or 151B that is active fiber, for example, a section doped with ytterbium. As above, the high power fiber amplifiers 150A-150E preferably have moderate birefringence, for example, birefringence less than or equal to approximately $1 \times 10^{-5}$-$1 \times 10^{-4}$. As before, the high power fiber amplifiers 150A-150E preferably comprise at least two PM fiber segments 151A and 151B that are spliced together at respective splices 105A and 105B and are preferably aligned at the respective splices 105A and 105B at either approximately a 0° relative angle or approximately a 90° relative angle. As above, to simplify illustration, only high power fiber amplifier 150A is shown as comprising fiber segments 151A and 151B and splices 105A and 105B. Commonly, the high power fiber amplifiers 150A-150E will comprise multiple fiber segments 151A and 151B and multiple corresponding splices 105A and 105B.

The combined action of respective pre-amplifiers 147A-147E and respective high power fiber amplifiers 150A-150E again amplifies respective component pre-amplified beams 148A-148E to respective desired power levels and transmits resulting component amplified beams 155A-155E through the cores of respective amplifier output fibers 410A-410E.

The respective amplifier output fibers 410A-410E of the respective high power fiber amplifiers 150A-150E are assembled into the TFB 420. The respective amplifier output fibers 410A-410E comprising the TFB 420 are brought into close proximity and are fused together such that their fused fiber cores have desired relative positions, diameters, and lengths to enable efficient close coupling of the component amplified output beams 155A-155E guided in the cores of fibers 410A-410E. The respective component amplified beams 155A-155E in the cores of respective amplifier output fibers 410A-410E are controlled with desired respective phases so that the respective component amplified beams 155A-155E are coherently coupled in the TFB 420. When the amplified output beams are properly phased, this procedure generates at a TFB output 430 a single high power combined beam 242. The single combined beam 242 comprises components that can be individually modulated according to embodiments of the invention. Optionally, an endcap 440 can be fused to the TFB output 430 in order to allow the combined beam 242 to expand before reaching the air-glass interface so as to minimize optical damage at the surface of the glass.

The resulting combined beam 242 then passes through one or more collimating optics 160. In this example, the collimating optics 160 constitute a collimating and magnifying telescope 160 that both collimates combined beam 242 and adjusts the size of combined beam 242, thereby generating a larger collimated beam with respective component collimated beams 165A-165E. Next respective component collimated beams are directed to a beam sampler 170.

Beam sampler 170 samples the output beam 145 and reflects a first low power sample beam 172 while transmitting output beam 145, which comprises output beam components 145A-145E.

First low power sample beam 172 passes through polarizing filter 257, which reflects a second low power sample beam 256 to polarization detector 180 while transmitting a resulting polarized beam 258 on to phase detector 255.

Phase detector 255 detects the phase of the first polarized beam 258 and thereby determines the phase of the output beam 145 and transmits output in the form of phase feedback 260 to synchronous phase processor 265, which transmits phase instructions 270 to the piston phase modulators 130A-130E based on the phase of the first low power sample beam 172. A synchronous phase processor is required to distinguish the output beam components 145A-145E in a single phase detector 255.

Preferably, the phase feedback 260 may be in the form of a phase error signal 260. Phase feedback control loops within the synchronous phase processor 265 adjust the phases of output beam components 145A-145E to minimize (or maximize) the phase error signal 260.

Polarization detector 180 detects the polarization state of the second low power sample beam 256 and thereby determines the polarization of the output beam 145 and transmits output in the form of polarization feedback 185 to a synchronous polarization processor 190 which transmits polarization instructions 195 to the polarization controllers 140A-140E based on the polarization feedback 185. Preferably, the polarization feedback 185 may be in the form of polarization error signals 185. Polarization feedback control loops within the synchronous polarization processor 190 adjust the polarization of output beam 145 to minimize (or maximize) the polarization error signal 185.

The polarization feedback 185 and the polarization feedback control loops within the polarization processor 190 ensure that the polarization controllers 140A-140E align the polarization axes of the output beam components 145A-145E with a desired common polarization axis. Further, the portions of the output beam components 145A-145E aligned with the principal birefringent axes of the respective high power fiber amplifiers 150A-150E have approximately equal power.

Set up as described, the synchronous polarization processor 190, using the polarization feedback 185, sends appropriate polarization instructions 195 to polarization controllers 140A-140E. Accordingly, after experiencing the accumulated birefringence throughout the high power fiber amplifiers 150A-150E, the state of polarization of the output beam 145 will be substantially linear and will be approximately aligned with a desired polarization axis of known orientation relative to the principal birefringent axes of the high power fiber amplifier 150. This ensures that the components of the output beam 145 aligned with the principal birefringent axes of the high power fiber amplifier 150 have approximately equal power, yielding an improvement by a factor of approximately two in the FWM threshold.

This ensures that the power of the portions of the output beam components 145A-145E aligned with the principal birefringent axes of the high power fiber amplifiers 150A-150E are approximately equal, yielding an improvement by a factor of approximately two in the respective FWM thresholds.

Figure 4C:
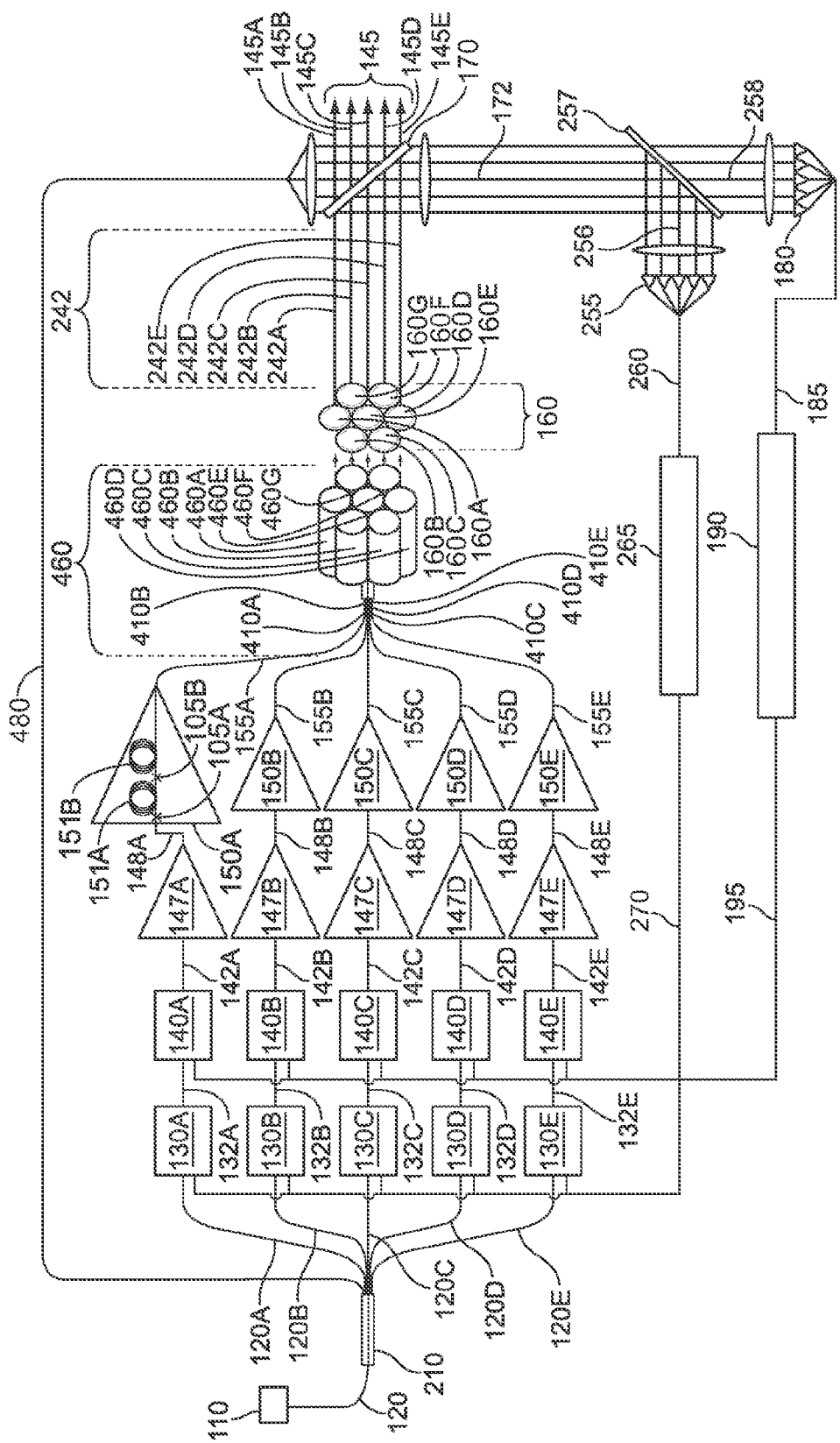
FIG. 4C is a drawing of an apparatus for suppression of FWM using polarization control and phase control with a combiner comprising a standard phased tiled fiber array in a coherent beam combination architecture.

FIG. 4C is a drawing of an apparatus for suppression of FWM using polarization control and phase control with a standard phased tiled fiber array (TFA) pursuant to a coherent signal combination architecture.

In FIG. 4C, an MO 110 of appropriate spectral characteristics generates an input beam 120, preferably an input beam 120 of low power seed light. The MO 110 is preferably phase modulated in order to suppress FWM. The input beam 120 passes through a beam splitter 210 that divides the input beam 120 into N component input beams 120A-120E. In this example, N=5.

One or more of the component input beams 120A-120E then passes through one or more respective piston phase modulators 130A-130E. The one or more piston phase modulators 130A-130E again have the ability to transform the piston phases of respective component input beams 120A-120E into any arbitrary phases in the resulting component modulated beams 132A-132E. One or more of component modulated beams 132A-132E has its piston phase adjusted by one of the respective piston phase modulators 130A-130E as needed to control coherent combination in the output beam 145.

Next one or more component modulated beams 132A-132E pass through respective polarization controllers 140A-140E, which, as above, have the ability to transform the polarizations of respective component input beams 120A-120E into any arbitrary state of polarization for the resulting component polarization-controlled beams 142A-142E. The component polarization-controlled beams 142A-142E eventually emerge as output beam 145, comprising component output beams 145A-145E, after passing through one or more respective high power pre-amplifiers 147A-147E, then through one or more respective high power fiber amplifiers 150A-150E, and through other components discussed below.

The polarization controllers 140A-140E again adjust the polarizations of the respective component polarization-controlled beams 142A-142E to ensure that the polarization of the output beam components 145A-145E is approximately equal to a desired polarization. To help ensure that the output beam components 145A-145E have similar polarizations, it is preferable that the respective principal birefringent axes of the corresponding high power fiber amplifiers 150A-150E be substantially aligned with each other. The respective FWM thresholds of the high power fiber amplifiers 150A-150E may again be thereby increased by a factor of up to approximately two.

Preferably, the respective pre-amplifiers 147A-147E comprise non-PM fiber. As above, the respective pre-amplifiers 147A-147E increase the signal power of the resulting respective component pre-amplified beams 148A-148E. As above, the respective pre-amplifiers 147A-147E may comprise one or more pre-amplifier stages (not shown) and again, the pre-amplifier stages may be separated by one or more optical isolators (not shown).

Next respective component pre-amplified beams 148A-148E then pass through respective high power fiber amplifiers 150A-150E. As above, the increase in the signal power of respective component pre-amplified beams 148A-148E produced by respective pre-amplifiers 147A-147E is sufficient to fully saturate the respective high power fiber amplifiers 150A-150E, thereby efficiently generating component amplified beams 155A-155E. Again, the pre-amplifiers 147A-147E may be separated by one or more optical isolators (not shown). Again, high power fiber amplifiers 150A-150E may comprise one or more high power fiber amplifier stages (not shown).

As before, the high power fiber amplifiers 150A-150E preferably comprise one or more fiber segments 151A and 151B. As above, the high power fiber amplifiers 150A-150E preferably comprise at least one respective section 151A or 151B that is active fiber, for example, a section doped with ytterbium. As above, the high power fiber amplifiers 150A-150E preferably have moderate birefringence, for example, birefringence less than or equal to approximately $1 \times 10^{-5}$-$1 \times 10^{-4}$. As before, the high power fiber amplifiers 150A-150E preferably comprise at least two PM fiber segments 151A and 151B that are spliced together at respective splices 105A and 105B and are preferably aligned at the respective splices 105A and 105B at either approximately a 0° relative angle or approximately a 90° relative angle. Once more, to simplify illustration, only high power fiber amplifier 150A is shown as comprising fiber segments 151A and 151B and splices 105A and 105B. Commonly, the high power fiber amplifiers 150A-150E will comprise multiple fiber segments 151A and 151B and multiple corresponding splices 105A and 105B.

The combined action of respective pre-amplifiers 147A-147E and respective high power fiber amplifiers 150A-150E again amplifies respective component pre-amplified beams 148A-148E to respective desired power levels and transmits resulting component amplified beams 155A-155E through the cores of respective amplifier output fibers 410A-410E.

The respective amplifier output fibers 410A-410E of the respective high power fiber amplifiers 150A-150E are assembled into a closely packed fiber array assembly or TFA 450. The TFA 450 optionally comprises one or more endcaps 460A-460G. FIG. 4C shows five high power fiber amplifiers 150A-150E and seven endcaps 460A-460G comprised in the TFA 450. Seven is a preferred number for a hexagonally close-packed array as depicted here for TFA 450. It is advantageous to keep the array as closely packed as possible, but any configuration of the array can be used. Optionally, one or more endcaps 460A-460G can be fused to the TFA 450 in order to allow the combined beam 242 to expand before reaching the air-glass interface so as to minimize optical damage at the surface of the glass.

The resulting high power combined beam 242 then passes through one or more collimating optics 160 that in this example comprises a collimating lens array 160 comprising collimating lenses 160A-160G. This procedure generates a single high power combined beam 242. The single combined beam 242 comprises components that can be individually modulated according to embodiments of the invention. Collimating lens array 160 collimates the combined beam 242, thereby generating a single coherent output beam 145 with a desired size, a desired configuration, and a desired collimation. Output beam 145 comprises output beam components 145A-145E.

A beam sampler 170 samples the output beam 145 and reflects a first low power sample beam 172 while transmitting output beam 145. First low power sample beam 172 passes through polarizing filter 257, which transmits a resulting polarized beam 258 to polarization detector 180 while reflecting a second low power sample beam 256 on to phase detector 255.

Phase detector 255 detects the phase of the second low power sample beam 256 and thereby determines the phase of the output beam 145 and transmits output in the form of phase feedback 260 to synchronous phase processor 265, which transmits phase instructions 270 to the piston phase modulators 130A-130E based on the phase of the first low power sample beam 172. Preferably, the phase feedback 260 may be in the form of a phase error signal 260. Phase feedback control loops within the synchronous phase processor 265 adjust the phases of output beam components 145A-145E to minimize (or maximize) the phase error signal 260.

Synchronous polarization detector 180 detects the polarization state of the polarized beam 258 and thereby determines the polarization of the output beam 145 and transmits output in the form of polarization feedback 185 to a synchronous polarization processor 190 which transmits polarization instructions 195 to the polarization controllers 140A-140E based on the polarization feedback 185. Preferably, the polarization feedback 185 may be in the form of polarization error signals 185. Polarization feedback control loops within the synchronous polarization processor 190 adjust the polarization of output beam components 145A-145E to minimize (or maximize) the polarization error signals 185.

The polarization feedback 185 and the polarization feedback control loop within the polarization controllers 140A-140E ensure that the polarization controllers 140A-140E align the polarization axes of the output beam components 145A-145E with a desired common polarization axis. Further, the portions of the respective output beam components 145A-145E aligned with the principal birefringent axes of the respective high power fiber amplifiers 150A-150E have approximately equal power.

The MO can be configured to generate a reference beam 480 that is capable, when the information it generates is combined with the first low power sample beam 172 from the beam sampler 170, of providing phase information to the phase detector. The phase information may comprise a heterodyne phase interference signal.

The phase detector 255 may comprise a phase detector array. The phase detector 255 may comprise a single phase detector. In the latter case, the phase processor must be a synchronous phase processor to distinguish the output beam components 145A-145E.

Set up as described, the synchronous polarization processor 190, using the polarization feedback 185, sends appropriate polarization instructions 195 to polarization controllers 140A-140E. Accordingly, after experiencing the accumulated birefringence throughout the high power fiber amplifiers 150A-150E, the state of polarization of the output beam 145 will be substantially linear and will be approximately aligned with a desired polarization axis of known orientation relative to the principal birefringent axes of the high power fiber amplifier 150. This ensures that the components of the output beam 145 aligned with the principal birefringent axes of the high power fiber amplifier 150 have approximately equal power, yielding an improvement by a factor of approximately two in the FWM threshold.

This ensures that the power of the portions of the output beam components 145A-145E aligned with the principal birefringent axes of the high power amplifiers 150A-150E are approximately equal, yielding an improvement by a factor of approximately two in the respective FWM thresholds.

Other coherent combination approaches are also applicable pursuant to alternative embodiments of the invention.

According to embodiments of the invention, the phase detector 255 may use one or more of a number of techniques such as LOCSET, which uses a small "tagging" phase modulation of unique frequency to identify each of the constituent beams in the single detector. LOCSET is discussed by Shay et al, Proceedings of SPIE, Volume 6102, pp. 61020V-1 to 61020V-5 (2006). According to further embodiments of the invention, the phase detector 255 may also use hill climbing dithering techniques such as stochastic parallel-gradient-descent (SPGD) to optimize phase. SPGD is discussed by M. A. Vorontsov et al., J. Opt. Soc. Am. A, Vol. 15, pp. 2745-2758 (1998).

Polarization sensing may be simply implemented with a polarizing filter and intensity detector, as shown, using the same tagging frequency to identify each beam and its polarization error. The polarizing filter can be arranged to align the polarization of the fiber output beams at 45° to the principal birefringent axes of the PM fiber, which will generally be optimal for suppression of FWM.

According to still further embodiments of the invention, the apparatus may comprise individual detectors to measure phase and/or polarization of each individual fiber beam prior to combination. This approach eliminates the need for tagging frequencies, but is more cumbersome for large number of beams.

Figure 5:
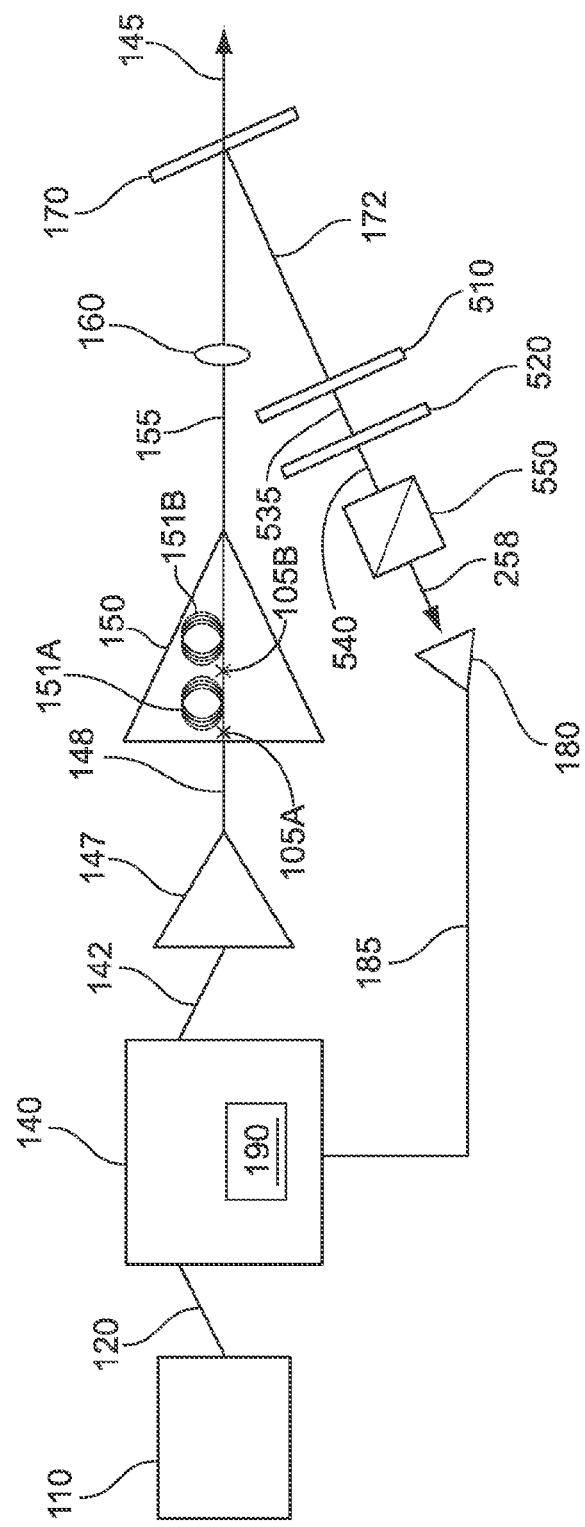
FIG. 5 is a schematic drawing of an architecture employing two phase retardation plates and a linear polarizer that can generate an arbitrary polarization angle and polarization state for the output beam.

While a linear output polarization is generally preferred for suppression of FWM, there may be some applications in which a circularly polarized output is preferred. FIG. 5 is a schematic drawing of an architecture employing two phase retardation plates and a linear polarizer that can generate an arbitrary polarization angle and polarization state for the output beam 145.

As illustrated in FIG. 5, this architecture combines first and second phase retardation plates 510 and 520 and a linear polarizer 550, all placed in the path of a low power sample 172 of the output beam 145.

The MO 110 generates an input beam 120 that passes through polarization controller 140, through pre-amplifier 147, through high power fiber amplifier 150, and through other components discussed below, eventually emerging as output beam 145. As discussed above, the polarization controller 140 adjusts the polarization of the polarization-controlled beam 142 to ensure that the polarization of the output beam 145 is approximately equal to a desired polarization state. Again the FWM threshold of the fiber amplifier 150 may be thereby increased by a factor of up to approximately two.

Preferably, the pre-amplifier 147 comprises non-PM fiber. The pre-amplifier 147 increases the signal power of the resulting pre-amplified beam 148. Again, the pre-amplifier 147 may comprise one or more pre-amplifier stages (not shown) and again, the pre-amplifier stages may be separated by one or more optical isolators (not shown). After passing through the polarization controller 140 and the pre-amplifier 147, the pre-amplifier beam 148 passes through the high power amplifier 150. The increase in the signal power of pre-amplified beam 148 produced by the pre-amplifier 147 is again sufficient to fully saturate the high power fiber amplifier 150. Again, the pre-amplifier 147 and the high power fiber amplifier 150 may be separated by one or more optical isolators (not shown). Again, high power fiber amplifier 150 may comprise one or more high power fiber amplifier stages (not shown). Again, the high power fiber amplifier preferably comprises one or more fiber segments 151A and 151B, at least one of which is preferably active fiber. Again the high power fiber amplifier 150 preferably has moderate birefringence and preferably comprises at least two PM fiber segments 151A and 151B that are spliced together at respective splices 105A and 105B. Again, the birefringent axes of the two PM fiber segments 151A and 151B are preferably aligned at respective splices 105A and 105B at either approximately a 0° relative angle or approximately a 90° relative angle. The combined action of pre-amplifier 147 and high power fiber amplifier 150 again amplifies pre-amplified beam 148 to a desired power level and transmits a resulting amplified beam 155.

After the high power fiber amplifier 150, the amplified beam 155 is collimated by lens 160 and then passes through a beam splitter 170, which transmits a high power output beam 145 and reflects a low power sample beam 172 that is directed through a first phase retardation plate 510, creating a first retarded beam 535. For example, the first phase retardation plate may be a ¼-wave phase retardation plate 510. Next the first retarded beam 535 passes through a second phase retardation plate 520, creating a second retarded beam 540. For example, the second phase retardation plate may be a ½-wave phase retardation plate. Then the second retarded beam 540 passes through a linear polarizer 550. The linear polarizer 550 polarizes the second retarded beam 540, generating a polarized beam 258, which transmits power dependent on the polarization of the second retarded beam 540.

After passing through the linear polarizer, the polarized power of the polarized beam 258 is detected by the polarization detector 180, enabling the polarization control loop within the polarization processor 190 to activate polarization feedback 185 and thereby to control the polarization of output beam 145.

The polarization controller 140 has the ability to transform any arbitrary state of polarization of input beam 120 into any arbitrary state of polarization of output beam 145. The polarization controller 140 is configured to ensure a high degree of alignment with a desired polarization state in output beam 145. A polarization detector 180 detects the polarized power of the second retarded beam 540 and thereby provides a polarization error signal 185 that is a measure of the deviation of the polarization of the output beam 145 from the desired polarization state. The polarization detector then transmits output in the form of polarization feedback 185 to a polarization processor 190 (in this case comprised within the polarization controller 140), which transmits polarization instructions to the polarization controller 140 based on the polarization feedback 185. Preferably, the polarization feedback 185 may be in the form of polarization error signals 185. Polarization feedback control loops within the polarization processor 190 adjust the polarization of output beam 145 to minimize (or maximize) the polarization error signal 185. By appropriate positioning of the first phase retardation plate 510 and the second phase retardation plate 520, the output beam 145 can be locked onto any desired state of polarization.

As discussed above with reference to FIG. 1A, generally, if two or more PM fibers are spliced in the high power fiber amplifier 150, the birefringent axes of the fibers are preferably aligned at the respective splices 105A and 105B with a relative angle of approximately 90°. Throughout the entire fiber chain from the polarization controller 140 to the output of the high power fiber amplifier 150, it is important to minimize any polarization dependent loss (PDL) or polarization dependent gain (PDG) in order to enable the controller to stably maintain the polarization of the output beam 145.

In addition, standard PM large mode area fiber used for high power amps typically has a birefringence of $\sim 2 \times 10^{-4}$-$4 \times 10^{-4}$, and as a result can become very lossy for the lower numerical aperture (NA) polarization mode when coiled in the typical tight coil (diameter $\sim 10$ cm) used for ensuring near single mode operation. Such loss, which will prevent efficient operation of the amp with the proposed method can be eliminated by reducing the birefringence of the fiber by a large amount (eg 5-10× or more). This method using lower birefringence fiber will still enable the proposed SBS or other forms of FWM reduction, but also minimize any differential loss between the two polarization modes of the fiber to a negligible level.

For high power fibers with large transverse mode areas and low NA (~0.06 or smaller), PM fibers with high birefringence ($\Delta n$~3-4×10$^{-4}$) can exhibit a significant difference in gain or loss for the two polarizations, since the birefringence can be a significant fraction of the index variation used to contain the optical mode ($\Delta n$~10$^{-3}$), or due to other effects. Depending on whether this is an issue for the usual PM fibers used in a particular high power configuration, further embodiments of the invention can help suppress FWM.

The suppression of FWM via excitation of both polarization axes of birefringent fiber requires that the polarization state vary rapidly along the fiber length in comparison to the gain length of the FWM process. The e-folding gain length for FWM in these fibers is typically ~10's of cm or longer. Therefore, suppression of FWM requires a birefringence beat length ($\lambda/\Delta n$) of only ~a few cm, perhaps larger. The beat length of a typical PM fiber ($\Delta n$~3.5×10$^{-4}$) is ~3 mm. Thus, one should be able to achieve good (~2×) FWM suppression with fiber beat length ~3 cm, or birefringence as low as $\Delta n$~1×10$^{-5}$, or perhaps lower.

If needed for additional FWM suppression, a system may be configured according to further embodiments of the invention that uses no PM fiber and has minimal PDL and PDG, yet employs fiber with a moderate amount of birefringence. For example, birefringence may be less than or equal to approximately 1×10$^{-5}$-1×10$^{-4}$. According to embodiments of the invention, this approximately equates to a minimum birefringence needed to suppress SBS or other forms of FWM and also minimize any undesired PDL or PDG.

Other approaches to increasing total system power include increasing the number of fibers, the area of the fiber core, and bandwidth used in each fiber amp, but these have various practical limitations. In any case, the method described herein augments whatever other methods are employed towards higher laser system power.

Figure 6:
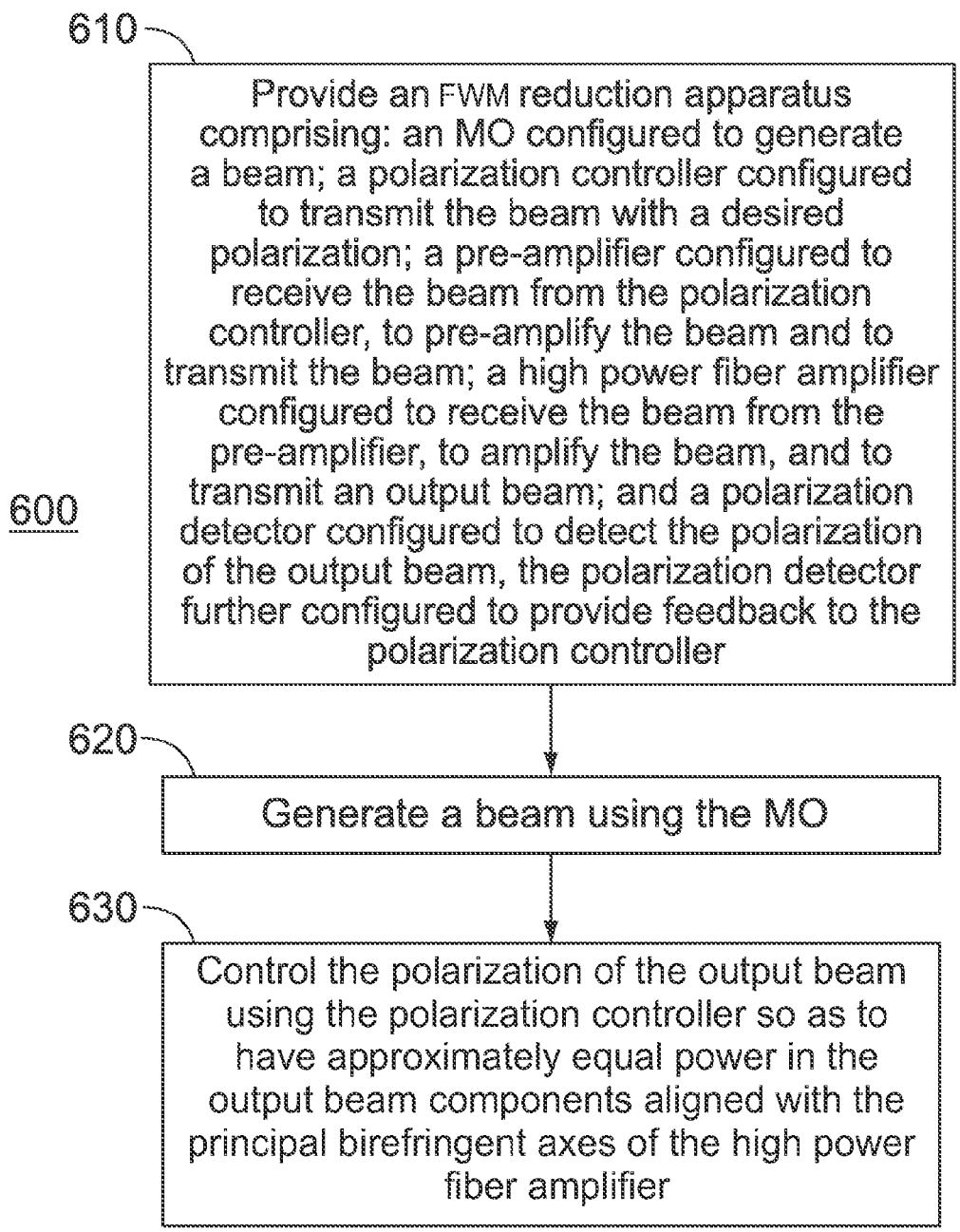
FIG. 6 is a flowchart of a method for suppressing FWM using polarization control with a high power PM fiber amplification system that employs a single beam.

FIG. 6 is a flowchart of a method 600 for suppression of FWM using a single beam in a high power polarization maintaining fiber amplifier system as described in various representative embodiments. The order of the steps in the method 600 is not constrained to that shown in FIG. 7 or described in the following discussion. Several of the steps could occur in a different order without affecting the final result.

In block 610, an FWM reduction apparatus is provided comprising: an MO configured to generate a beam; a polarization controller configured to transmit the beam with a desired polarization; a pre-amplifier configured to receive the beam from the polarization controller, to pre-amplify the beam, and to transmit the beam; a high power fiber amplifier configured to receive the beam from the pre-amplifier, to amplify the beam, and to transmit an output beam; and a polarization detector configured to detect the polarization of the output beam, the polarization detector further configured to provide feedback to the polarization controller. Block 610 then transfers control to block 620.

In block 620, a beam is generated using the MO. Block 620 then transfers control to block 630.

In block 630, the polarization of the output beam is controlled using the polarization controller so as to ensure that the output beam components aligned with the principal birefringent axes of the high power fiber amplifier have approximately equal power. Block 630 then terminates the process.

Figure 7:
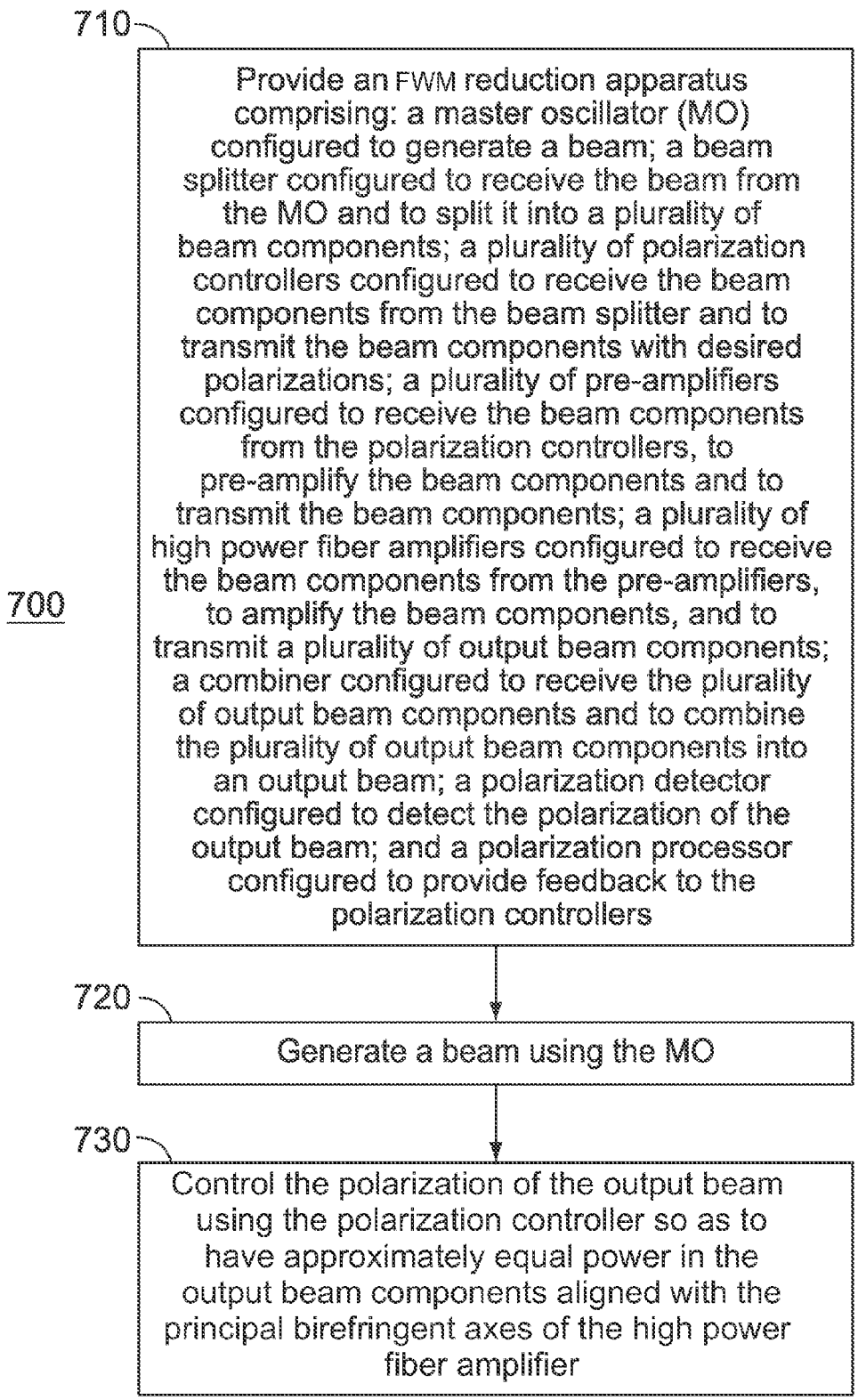
FIG. 7 is a flowchart of a method for suppressing FWM using polarization control with a high power PM fiber amplification system that employs a plurality of beams.

FIG. 7 is a flowchart of another representative embodiment of a method 700 for suppression of FWM using polarization control and a plurality of beams in a high power polarization maintaining fiber amplifier system. The order of the steps in the method 700 is not constrained to that shown in FIG. 8 or described in the following discussion. Several of the steps could occur in a different order without affecting the final result.

In block 710, an FWM reduction apparatus is provided comprising an MO configured to generate an input beam; a beam splitter configured to receive the beam from the MO and to it into a plurality of beam components; a plurality of polarization controllers configured to receive the beam components from the beam splitter and to transmit the beam components with desired polarizations; a plurality of pre-amplifiers configured to receive the beam components form the polarization controllers, to pre-amplify the beam components, and to transmit the beam components; a plurality of high power fiber amplifiers configured to receive the beam components from the pre-amplifiers, to amplify the beam components, and to transmit a plurality of output beam components; a combiner configured to receive the plurality of output beam components and to combine the plurality of output beam components into an output beam; a polarization detector configured to detect the polarization of the output beam; and a polarization processor configured to provide feedback to the polarization controllers d so as to reduce FWM. Block 710 then transfers control to block 720.

In block 720, a beam is generated using the MO. Block 720 then transfers control to block 730.

In block 730, the polarization of the output beam is controlled using the polarization controller so as to ensure that the output beam components aligned with the principal birefringent axes of the high power fiber amplifier have approximately equal power. Block 730 then terminates the process.

While the above representative embodiments have been described with certain components in exemplary configurations, it will be understood by one of ordinary skill in the art that other representative embodiments can be implemented using different configurations and/or different components. For example, it will be understood by one of ordinary skill in the art that the order of certain components can be altered without substantially impairing the functioning of the invention. For example, the polarization controllers 140A-140E can be positioned before the piston phase modulators 130A-130E in FIG. 4 without substantially impairing the functioning of the invention. As another example, the first beam sampler 170A and the second beam sampler 170B in FIG. 4 can be integrated into the same beam sampling device.

The representative embodiments and disclosed subject matter, which have been described in detail herein, have been presented by way of example and illustration and not by way of limitation. It will be understood by those skilled in the art that various changes may be made in the form and details of the described embodiments resulting in equivalent embodiments that remain within the scope of the appended claims.

What is claimed is:

1. An apparatus for reducing four-wave mixing (FWM), comprising:
   a master oscillator (MO) configured to generate a beam;
   a polarization controller configured to receive the beam from the MO and to transmit the beam with a desired polarization;
   a pre-amplifier configured to receive the beam from the polarization controller, to pre-amplify the beam, and to transmit the beam;
   a high power fiber amplifier configured to receive the beam from the pre-amplifier, to amplify the beam, and to transmit an output beam; and a polarization detector configured to detect the polarization of the output beam, the polarization detector further configured to transmit feedback to the polarization controller to ensure that the output beam polarization components are aligned with the principal birefringent axes of the high power fiber amplifier so as to have approximately equal power polarized along one or more of the two axes.

2. The apparatus as recited in claim 1, wherein FWM comprise stimulated Brillouin scattering (SBS).

3. The apparatus as recited in claim 1, wherein FWM comprise FWM other than SBS.

4. The apparatus as recited in claim 1, wherein the polarization of the output beam is approximately linear.

5. The apparatus as recited in claim 4, wherein the polarization angle is approximately 45 degrees with respect to the principal birefringent axes of the high power fiber amplifier.

6. The apparatus as recited in claim 1, wherein the polarization of the output beam is approximately circular.

7. The apparatus as recited in claim 1, wherein the polarization of the output beam is approximately elliptical.

8. The apparatus as recited in claim 7, wherein the major axis of the ellipse has an angle of approximately 45 degrees with respect to the principal birefringent axes of the high power fiber amplifier.

9. The apparatus as recited in claim 1, further comprising:
a polarization processor configured to provide feedback to the plurality of polarization controllers to ensure that the output beam polarization components are aligned with the principal birefringent axes of the high power fiber amplifier so as to have approximately equal power polarized along one or more of the two axes.

10. The apparatus as recited in claim 1, further comprising:
a piston phase modulator configured to receive the beam from the MO and to adjust the beam phase to a desired value.

11. The apparatus as recited in claim 10, further comprising:
a phase detector configured to detect the phase of the output beam; and
a phase processor configured to provide feedback to the piston phase modulator to ensure that the output beam has a desired phase.

12. The apparatus as recited in claim 1, wherein the MO generates at least two beams, and further comprising:
a combiner configured to receive the beams from the fiber amplifier, to combine the plurality of beams into an integrated output beam, and to transmit an output beam.

13. The apparatus as recited in claim 1, wherein the high power fiber amplifier comprises a plurality of polarization maintaining (PM) fiber segments that are spliced together.

14. The apparatus as recited in claim 13, wherein the plurality of spliced PM fiber segments are spliced together with their birefringent axes aligned at an approximate relative angle of 90°.

15. The apparatus as recited in claim 13, wherein the birefringences of the plurality of spliced PM fiber segments are approximately equal.

16. The apparatus as recited in claim 13, wherein the sum of the products of the fiber segments' length and the fiber segments' birefringence produces a delay that is less than a delay limit.

17. The apparatus as recited in claim 1, wherein the polarization controller ensures that the polarization of the output beam comprises a state of substantially linear polarization.

18. The apparatus as recited in claim 1, wherein the high power fiber amplifier further comprises:

at least one high power fiber amplifier stage configured to receive the beam from the pre-amplifier, to amplify the beam, and to transmit the beam.

19. The apparatus as recited in claim 18, wherein at least two high power fiber amplifier stages are separated by an optical isolator.

20. The apparatus as recited in claim 1, wherein the pre-amplifier and the high power fiber amplifier are separated by an optical isolator.

21. The apparatus as recited in claim 1, wherein the high power fiber amplifier comprises optical fiber with a birefingence that lies in the approximate range of $1\times10^{-5}$-$1\times10^{-4}$.

22. The apparatus as recited in claim 1, wherein the high power fiber amplifier comprises birefringent optical fiber with a beat length less than the gain length of the FWM.

23. The apparatus as recited in claim 1, wherein the apparatus is configured to minimize the polarization dependent loss (PDL).

24. The apparatus as recited in claim 1, wherein the apparatus is configured to minimize the polarization dependent gain (PDG).

25. The apparatus as recited in claim 1, wherein the pre-amplifier further comprises:
at least one pre-amplifier stage configured to receive the beam from the polarization controller, to pre-amplify the beam, and to transmit the beam.

26. The apparatus as recited in claim 25, wherein at least two pre-amplifier stages are separated by an optical isolator.

27. An apparatus for reducing four-wave mixing (FWM), comprising:
a master oscillator (MO) configured to generate a beam;
a beam splitter configured to receive the beam from the MO and to split it into a plurality of beam components;
a plurality of polarization controllers configured to receive the beam components from the beam splitter and to transmit the beam components with desired polarizations;
a plurality of pre-amplifiers configured to receive the beam components from the polarization controllers, to pre-amplify the beam components, and to transmit the beam components;
a plurality of high power fiber amplifiers configured to receive the beam components from the pre-amplifiers, to amplify the beam components, and to transmit a plurality of output beam components;
a combiner configured to receive the output beam components, to combine the output beam components into an output beam, and to transmit an output beam;
a polarization detector configured to detect the polarization of the output beam; and
a polarization processor configured to provide feedback to the polarization controllers to ensure that the output beam polarization components are aligned with the principal birefringent axes of the high power fiber amplifier so as to have approximately equal power polarized along one or more of the two axes.

28. The apparatus as recited in claim 27, wherein the principal birefringent axes of at least two of the amplifiers are substantially aligned with each other.

29. The apparatus as recited in claim 28, wherein the polarizations of the components of the output beam corresponding to the amplifiers with substantially aligned birefringent axes are similar.

30. The apparatus as recited in claim 27, further comprising a
plurality of pre-amplifiers configured to receive the plurality of beam components, configured to pre-amplify the plurality of beam components and configured to transmit the plurality of beam components to the high power fiber amplifier.

31. The apparatus as recited in claim 27, further comprising:
a plurality of piston phase modulators configured to receive the plurality of beam components and to transmit the beam components with desired phases;
a phase detector configured to detect the phase of the output beam;
and a phase processor configured to provide feedback to the plurality of piston phase modulators to ensure that the output beam has a desired phase.

32. The apparatus as recited in claim 27, wherein the polarization detector further comprises a phase retardation plate.

33. The apparatus as recited in claim 27, wherein the combiner comprises a diffraction grating.

34. The apparatus as recited in claim 33, wherein the principal birefringent axes of the high power amplifiers are oriented at approximately a 45° angle relative to the dispersion axis of the diffraction grating.

35. The apparatus as recited in claim 27, wherein the combiner comprises standard phased tiled fiber arrays.

36. The apparatus as recited in claim 27, wherein the combiner comprises tapered fiber bundles.

37. The apparatus as recited in claim 27, wherein the polarization controller ensures that the polarization of the output beam comprises a state of approximately linear polarization.

38. The apparatus as recited in claim 27, wherein the high power fiber amplifier comprises optical fiber with a birefingence that lies in the approximate range of $1\times10^{-5}$-$1\times10^{-4}$.

39. The apparatus as recited in claim 27,
further comprising a collimating optic configured to receive and to collimate the plurality of output beam components from the high power fiber amplifier, the collimating optic further configured to transmit the plurality of output beam components to the combiner at an appropriate angle of incidence.

40. The apparatus as recited in claim 27,
further comprising a first beam sampler configured to generate a first beam sample of the output beam and to transmit the first beam sample to the phase detector.

41. The apparatus as recited in claim 27,
further comprising a second beam sampler configured to generate a second beam sample of the output beam and to transmit the second beam sample to the polarization detector.

42. The apparatus as recited in claim 27,
further comprising a quarter-wave plate and a half-wave plate positioned in front of the polarization detector, the polarization processor configured to provide feedback to the plurality of polarization controllers to ensure that the output beam has the desired polarization.

43. An apparatus for reducing four-wave mixing (FWM), comprising:
a master oscillator (MO) configured to generate a plurality of beams of differing wavelengths and differing angles of incidence;
a plurality of polarization controllers configured to receive the plurality of beam components from the MO and to transmit the beam components with desired polarizations;
a plurality of pre-amplifiers configured to receive the beam components from the polarization controllers, to pre-amplify the beam components, and to transmit the beam components;
a plurality of high power fiber amplifiers configured to receive the plurality of beam components from the pre-amplifiers, to amplify the beam components, and to transmit a plurality of output beam components;
a combiner configured to receive the output beam components, to combine the output beam components into an output beam, and to transmit an output beam;
a polarization detector configured to detect the polarization of the output beam; and
a polarization processor configured to provide feedback to the plurality of polarization controllers to ensure that the output beam polarization components are aligned with the principal birefringent axes of the high power fiber amplifier so as to have approximately equal power polarized along one or more of the two axes.

44. An apparatus for reducing four-wave mixing (FWM), comprising:
a master oscillator (MO) configured to generate a beam;
a beam splitter configured to receive the beam from the MO and to split it into a plurality of beam components;
a plurality of polarization controllers configured to receive the plurality of beam components from the MO and to transmit the beam components with desired polarizations;
a plurality of pre-amplifiers configured to receive the beam components from the polarization controllers, to pre-amplify the beam components, and to transmit the beam components;
a plurality of high power fiber amplifiers configured to receive the plurality of beam components from the pre-amplifiers, to amplify the beam components, and to transmit a plurality of output beam components;
a tapered fiber bundle (TFB), the TFB configured to receive the plurality of output beam components, to coherently combine the plurality of output beam components into an output beam, and to transmit an output beam;
a polarization detector array configured to detect the polarization of the output beam components; and
a synchronous polarization processor configured to provide feedback to the plurality of polarization controllers to ensure that the output beam polarization components are aligned with the principal birefringent axes of the high power fiber amplifier so as to have approximately equal power polarized along one or more of the two axes.

45. The apparatus as recited in claim 44, wherein the principal birefringent axes of at least two of the amplifiers are substantially aligned with each other.

46. The apparatus as recited in claim 44, wherein the polarizations of the components of the output beam corresponding to the amplifiers with substantially aligned birefringent axes are similar.

47. The apparatus as recited in claim 44, further comprising:
a piston phase modulator configured to receive the beam from the MO and to adjust the beam phase to a desired value;
a phase detector configured to detect the phase of the output beam; and
a synchronous phase processor configured to provide feedback to the piston phase modulator to ensure that the output beam has a desired phase.

48. The apparatus as recited in claim 44, further comprising a magnifying and collimating telescope configured to generate an output beam with a desired amplitude and a desired collimation.

49. An apparatus for reducing four-wave mixing (FWM), comprising:

a master oscillator (MO) configured to generate a beam;
a beam splitter configured to receive the beam from the MO and to split it into a plurality of beam components;
a plurality of polarization controllers configured to receive the plurality of beam components from the MO and to transmit the beam components with desired polarizations;
a plurality of pre-amplifiers configured to receive the beam components from the polarization controllers, to pre-amplify the beam components, and to transmit the beam components;
a plurality of high power fiber amplifiers configured to receive the plurality of beam components from the pre-amplifiers, to amplify the beam components, and to transmit a plurality of output beam components;
a tiled fiber array (TFA), the TFA configured to receive the plurality of output beam components, to coherently combine the plurality of output beam components into an output beam, and to transmit an output beam;
a polarization detector array configured to detect the polarization of the output beam components; and
a polarization processor configured to provide feedback to the plurality of polarization controllers to ensure that the output beam polarization components are aligned with the principal birefringent axes of the high power fiber amplifier so as to have approximately equal power polarized along one or more of the two axes.

50. The apparatus as recited in claim 49, further comprising:
a piston phase modulator configured to receive the beam from the MO and to adjust the beam phase to a desired value;
a phase detector configured to detect the phase of the output beam; and
a phase processor configured to provide feedback to the piston phase modulator to ensure that the output beam has a desired phase.

51. The apparatus as recited in claim 49, wherein the MO is further configured to generate a reference beam capable of providing phase information to the phase detector.

52. The apparatus as recited in claim 50, wherein the phase detector comprises a phase detector array.

53. An apparatus for reducing four-wave mixing (FWM), comprising:
a master oscillator (MO) configured to generate a beam;
a polarization controller configured to receive the beam from the MO and to transmit the beam with a desired polarization;
a pre-amplifier configured to receive the beam from the polarization controller, to pre-amplify the beam, and to transmit the beam;
a high power fiber amplifier configured to receive the beam from the pre-amplifier, to amplify the beam, and to transmit an output beam;
a first phase retardation plate;
a second phase retardation plate, the first phase retardation waveplate and the second phase retardation plate configured to generate a desired polarization state; and
a polarization detector configured to detect the polarization of the output beam,
the polarization detector further configured to transmit feedback to the polarization controller to ensure that the polarization of the output beam is approximately equal to a desired polarization state and to ensure that the output beam polarization components are aligned with the principal birefringent axes of the high power fiber amplifier.

54. The apparatus as recited in claim 53, wherein the first phase retardation plate is a quarter-wave phase retardation plate.

55. The apparatus as recited in claim 53, wherein the second phase retardation plate is a half-wave phase retardation plate.

56. A method for reducing four-wave mixing (FWM), comprising:
providing an FWM reduction apparatus comprising:
a master oscillator (MO) configured to generate a beam;
a polarization controller configured to transmit the beam with a desired polarization;
a pre-amplifier configured to receive the beam from the polarization controller, to pre-amplify the beam, and to transmit the beam;
a high power fiber amplifier configured to receive the beam from the pre-amplifier, to amplify the beam, and to transmit an output beam; and
a polarization detector configured to detect the polarization of the output beam, the polarization detector further configured to provide feedback to the polarization controller;
generating a beam using the MO; and
controlling the polarization of the output beam using the polarization controller so as to ensure that the output beam polarization components are aligned with the principal birefringent axes of the high power fiber amplifier so as to have approximately equal power polarized along one or more of the two axes.

57. The method recited in claim 56, wherein at least one of the plurality of high power fiber amplifiers comprises at least two segments of polarization maintaining (PM) fiber that are spliced together with birefringent axes aligned at an approximate relative angle of 90°.

58. A method for reducing four-wave mixing (FWM), comprising:
providing an FWM reduction apparatus comprising:
a master oscillator (MO) configured to generate a beam;
a beam splitter configured to receive the beam from the MO and to split it into a plurality of beam components;
a plurality of polarization controllers configured to receive the plurality of beam components and to transmit the beam components with desired polarizations;
a plurality of pre-amplifiers configured to receive the plurality of beam components from the plurality of polarization controllers, to pre-amplify the beam components, and to transmit the beam components;
a high power fiber amplifier configured to receive the plurality of beam components from the plurality of pre-amplifiers, to amplify the beam components, and to transmit a plurality of output beam components;
a combiner configured to receive the plurality of output beam components, to combine the plurality of output beam components into an output beam, and to transmit the output beam;
a polarization detector configured to detect the polarization of the output beam; and
a polarization processor configured to provide feedback to the plurality of polarization controllers;
generating a beam using the MO; and
controlling the polarization of the output beam using the polarization controller so as to ensure that the output beam polarization components are aligned with the principal birefringent axes of the high power fiber amplifier so as to have approximately equal power polarized along one or more of the two axes.

59. The method as recited in claim 58, wherein at least one of the plurality of high power fiber amplifiers comprises at least two segments of PM fiber that are spliced together with birefringent axes aligned at an approximate relative angle of 90°.

* * * * *